(12) United States Patent
Levendel et al.

(10) Patent No.: US 8,184,605 B2
(45) Date of Patent: May 22, 2012

(54) INTERNET-ORIENTATED AD-HOC NETWORK

(75) Inventors: Issac Levendel, Chicago, IL (US); Jacques Hara, Barrington, IL (US)

(73) Assignee: Connectivities, LLC, Birmingham, MI (US)

( * ) Notice: Subject to any disclaimer, the term of this patent is extended or adjusted under 35 U.S.C. 154(b) by 0 days.

(21) Appl. No.: 13/080,362

(22) Filed: Apr. 5, 2011

(65) Prior Publication Data

US 2011/0268013 A1 Nov. 3, 2011

Related U.S. Application Data

(63) Continuation-in-part of application No. 12/693,187, filed on Jan. 25, 2010, now abandoned, and a continuation of application No. 11/014,700, filed on Dec. 20, 2004, now Pat. No. 7,668,146.

(51) Int. Cl.
*H04W 4/00* (2009.01)
*H04L 12/28* (2006.01)
*H04B 7/15* (2006.01)

(52) U.S. Cl. .......... 370/338; 370/405; 455/11.1

(58) Field of Classification Search ........ 455/445, 455/11.1
See application file for complete search history.

(56) References Cited

U.S. PATENT DOCUMENTS 5,602,839 A * 2/1997 Annapareddy et al. ...... 370/405
2006/0098607 A1 * 5/2006 Zeng et al. ............... 370/338

* cited by examiner

*Primary Examiner* — Nick Corsaro
*Assistant Examiner* — Joel Ajayi
(74) *Attorney, Agent, or Firm* — Akerman Senterfitt; Michael K. Dixon

(57) ABSTRACT

A hierarchical directional internet-oriented ad-hoc network, defined by a software infrastructure, is composed of gateway nodes and a plurality of wireless nodes, which may be fixed or mobile, and which may act as subscribers, routers, or both. The infrastructure hierarchy is defined by the hop count of each node (distance of that node to a fixed gateway node). The software infrastructure includes two tables associated with each node in the network: the upstream routing table which provides shortest routes to fixed gateway nodes through upstream neighbors, and the downstream routing table which provides shortest routes to subscribers through downstream neighbors. These two tables are used by routing algorithms. A peer table can also be used for alternate routes. The maintenance of the aforementioned tables is performed by autonomous algorithms operating locally on each node by receiving and processing signals from their neighbors.

50 Claims, 31 Drawing Sheets

Generalized URT: every node can be a GN

General form

| Associated GN | $N_i$ | Upstream node ID | $N_1$ | ... | $N_n$ |
|---|---|---|---|---|---|
| | GN or N | Physical medium | $T_1$ | ... | $T_n$ |
| | $HC_i$ | HC | $HC_1$ | ... | $HC_n$ |

Normal node in 4G

| $GN_k$ | $N_i$ | Upstream node ID | $N_1$ | ... | $N_n$ |
|---|---|---|---|---|---|
| | N | Physical medium | 4G | ... | 4G |
| | $HC_i$ | HC | $HC_1$ | ... | $HC_n$ |

Gateway node

| - | $N_i$ | Upstream node ID | $N_1$ | ... | $N_n$ |
|---|---|---|---|---|---|
| | GN | Physical medium | $T_1$ | ... | $T_n$ |
| | $HC_i = 0$ | HC | -1 | ... | -1 |

General form
N = Normal node
GN = Gateway Node
T = Connection type

Gateway node
$T_i$ = Wire
$T_i$ = 3G
$T_i$ = Private spectrum

FIGURE 19

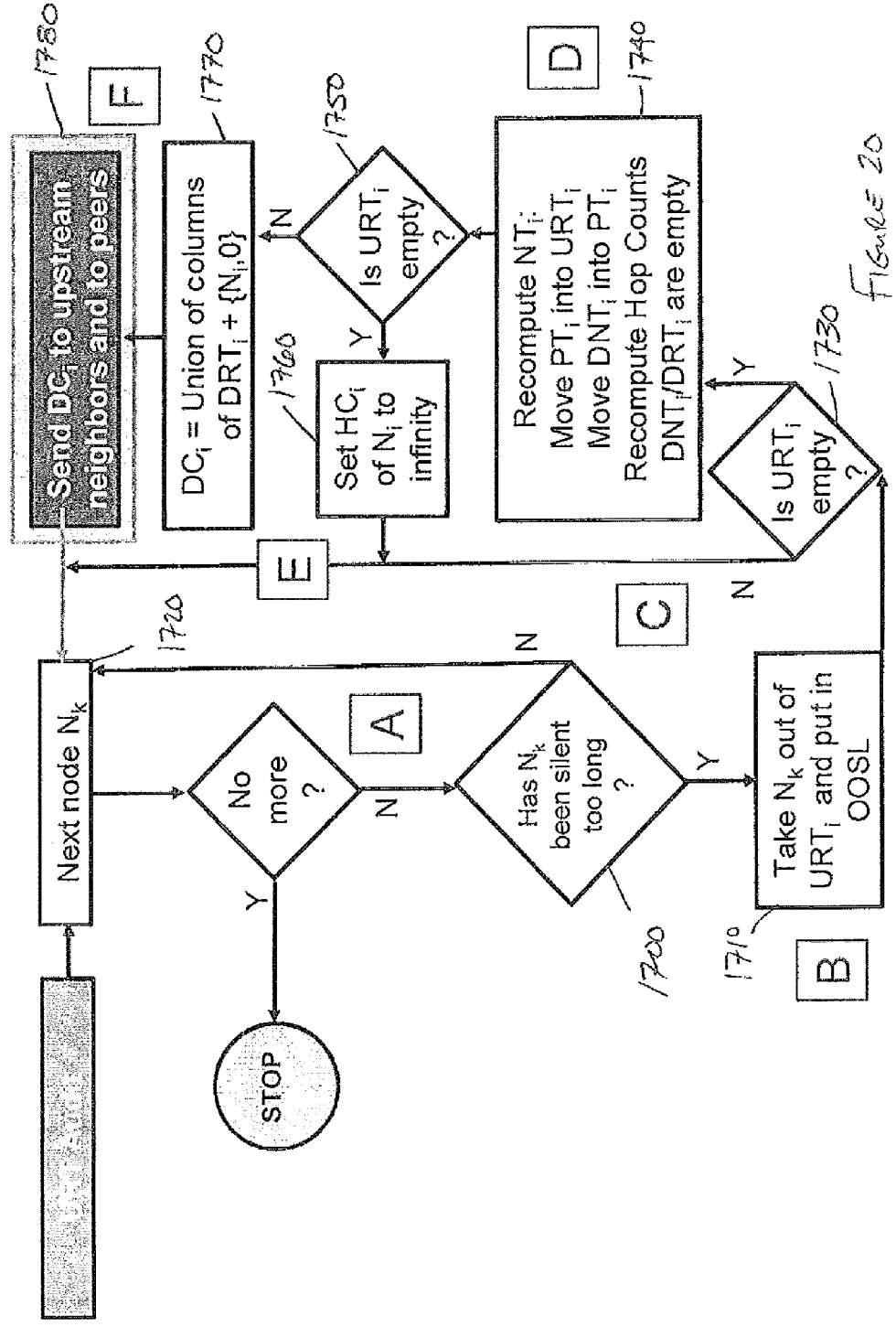

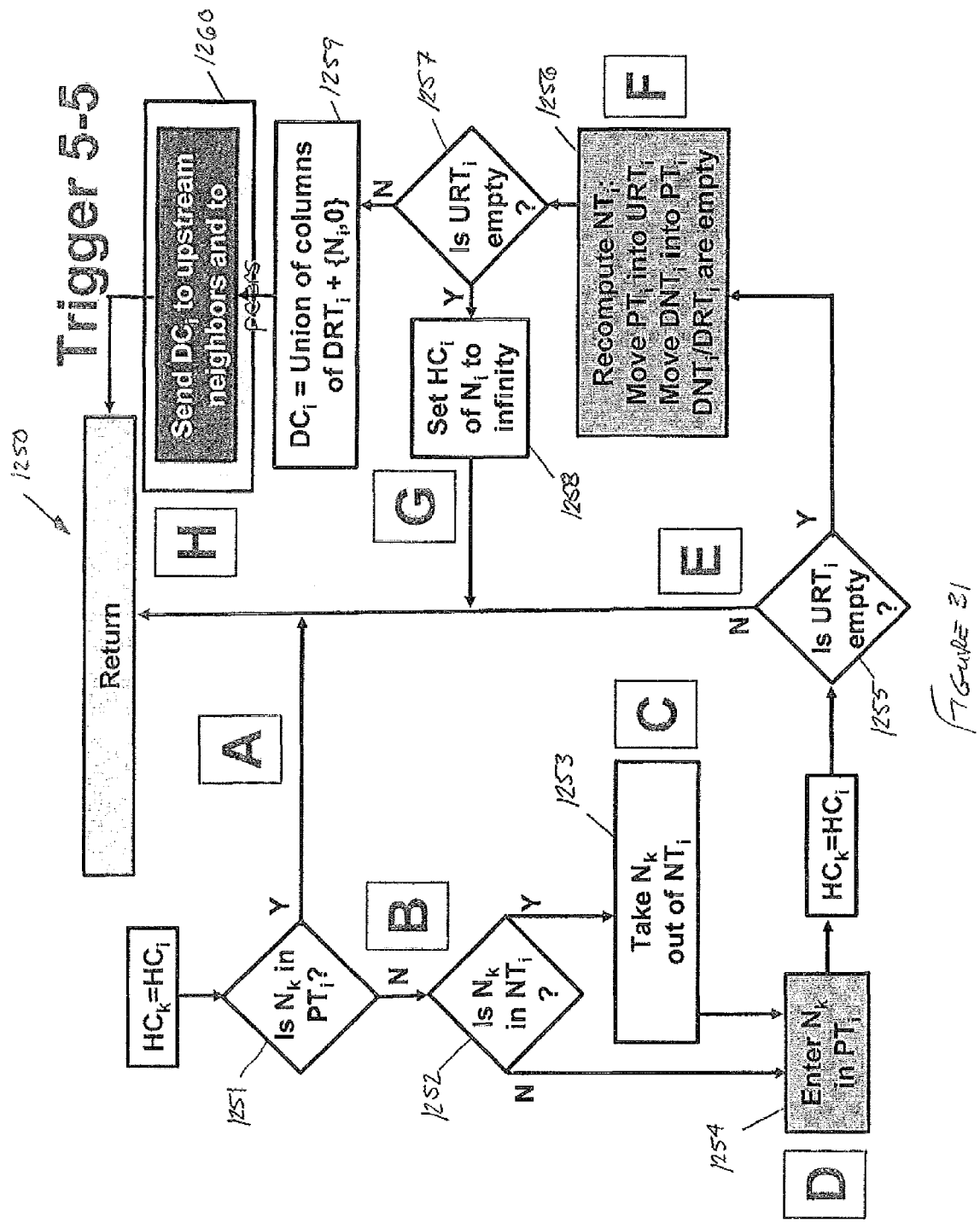

INTERNET-ORIENTATED AD-HOC NETWORK

CROSS-REFERENCE TO RELATED APPLICATION

This patent application is a continuation in part of U.S. patent application Ser. No. 12/693,187, filed Jan. 25, 2010, which is a continuation of U.S. patent application Ser. No. 11/014,700, filed Dec. 20, 2004, both of which are incorporated by reference in their entirety.

BACKGROUND

Ad-hoc networks are becoming more widely used, especially for mobile wireless devices. An attractive feature of ad-hoc networks is that they do not require a network infrastructure of base stations/fixed gateway nodes to enable communications between wireless nodes. Instead, the wireless nodes are capable of acting as base stations/access points that relay communications for other wireless nodes in the network. Thus, each node can, at various times, act as a source of information, a drain for information, and a router for information.

Traditionally, the focus of ad-hoc networks has been communications between wireless nodes on the network. More sophisticated ad-hoc networks that provide for access to fixed, wired networks have also been proposed. This allows wireless devices to communicate with other types of wired networks, such as the PSTN and the Internet.

One shortcoming associated with known ad-hoc networks, including the more sophisticated ad-hoc networks discussed above, is that they are typically oriented toward enabling communication between nodes, with the direction of such communication being somewhat random. These networks are not as efficient as possible for other types of communication, such as Internet-oriented communication, in which the flow of data is strongly directional (i.e., from fixed gateway nodes downward to wireless nodes and vice versa).

What is needed is a network that can efficiently handle communications such as the Internet that are directionally oriented.

SUMMARY

The aforementioned issues are addressed to a great extent by an ad-hoc network with an internet-oriented, software-defined dynamic infrastructure. The ad-hoc network includes at least one fixed gateway node and a plurality of wireless nodes. As used herein, a fixed gateway node means a node that is in a fixed location and that acts as a gateway, or access point, between the ad-hoc network and another network such as the Internet. In some embodiments, all of the wireless nodes are mobile. In other embodiments, some of the wireless nodes are mobile and some are at fixed locations, which shall be referred to herein as "home nodes." (As used herein, the term "home node" should be understood to refer to a wireless node that is in a fixed location and should not be understood to be limited to a fixed wireless node installed in a residence). At least some of the wireless nodes, and, in some embodiments, all of the wireless nodes, may perform a routing function for other wireless nodes. In embodiments with multiple fixed gateway nodes, the fixed gateway nodes may be connected to the other network via a central node or may be connected directly to the other network. In the latter case, the fixed gateway node serves as a central node.

This ad-hoc network is hierarchical based on distances, measured in hop counts, to fixed gateway nodes. Each of the wireless nodes in the network (which may be fixed wireless nodes or mobile wireless nodes) in the ad-hoc network has a hop count with respect to each fixed gateway node. Any given wireless node may have one or more neighborhood nodes with which the wireless node can communicate directly. The neighborhood nodes will be either upstream (i.e., closer, as measured by hop count, to the fixed gateway node), downstream (further away, as measured by hop count, from the gateway node), or at the same distance (referred to herein as a peer node).

Each wireless node in the network also has at least one of each of four tables that describe the node's neighborhood and that are used for routing and other functions: 1) a downstream neighbor table, 2) a downstream routing table, 3) an upstream routing table, and 4) a peer table. The upstream routing table lists each upstream node in the wireless node's neighborhood together with a hop count to the fixed gateway node. In embodiments with multiple fixed gateway nodes, there is a plurality of upstream routing tables and each upstream routing table pertains to a different fixed gateway node. The peer routing table lists each peer node in the node's neighborhood along with au associated hop count to the fixed gateway node and, in embodiments with multiple fixed gateway nodes, each node has a separate peer table for each fixed gateway node. The downstream neighborhood table lists each downstream neighbor with respect to a particular fixed gateway node (again, there is a separate downstream neighborhood table for each fixed gateway node in embodiments with multiple fixed gateway nodes). The downstream routing table lists each downstream node (including downstream neighborhood nodes) reachable from the node together with an associated hop count, and in embodiments with multiple fixed gateway nodes, there is a multiplicity of downstream routing tables and each downstream routing table pertains to a different fixed gateway node. The aforementioned tables define the connectivity for the network. A number of triggers are generated during routing and at other times to cause the update of these tables. The tables are also audited periodically, either on an individual node basis or for the tables as a whole.

The Internet-oriented mobile ad-hoc network may be formed from one or more nodes that can operate in more than one mode. In particular, one or more of the nodes may be configured to alternate between functioning as a gateway node and functioning as a wireless node. The nodes may also be configured to alternate between operating as a fixed wireless node and a mobile wireless node.

The Internet-oriented mobile ad-hoc network may be configured to route signals through peer nodes. In particular, the network may be configured such that one or more nodes may include a peer downstream routing table (PDRT) such that the node will then be able to determine the downstream routing paths that exist downstream of the peer. The node may include PDRTs for peers that are one or more hop counts away. In one embodiment, the node may include PDRTS for all peers of that node. Nodes may independently and periodically receive and process control signals from one or more peer nodes with undated PDRT tables. The network may also include a loop suppression system to prevent formation of endless loops. The network may be configured such that each node in the network includes PDRTs of peer nodes.

The internet-oriented mobile ad-hoc network may also include an unacceptable links management system configured to maintain a level of service above a particular threshold. The unacceptable links management system may be configured to silence links that are determined to be unacceptable; to return links to service that have been silenced if the links become acceptable or, if the links have been silenced longer than a threshold time period, the links are moved to an out of service list; to periodically audit the out of service list to identify links that have service metrics greater than a threshold and returning those links to service; and to cancel links that remain below the threshold for more than a particular period of time.

BRIEF DESCRIPTION OF THE DRAWINGS

The aforementioned advantages and features will be more readily understood with reference to the following detailed description and the accompanying drawings in which:

FIG. 19 is a diagram of routing tables for nodes and gateway nodes according to another embodiment.

FIG. 20 is a flowchart of a periodic audit for silent nodes in a URTi.

FIG. 31 is a flowchart of T5 signal processing based upon the difference in hop counts between the sending and receiving nodes.

DETAILED DESCRIPTION

In the following detailed description, a plurality of specific details, such as numbers of nodes and hops, are set forth in order to provide a thorough understanding of the embodiments described herein. The details discussed in connection with the preferred embodiments should not be understood to limit the present invention. Furthermore, for ease of understanding, certain method steps are delineated as separate steps; however, these steps should not be construed as necessarily distinct nor order dependent in their performance.

Figure 1:
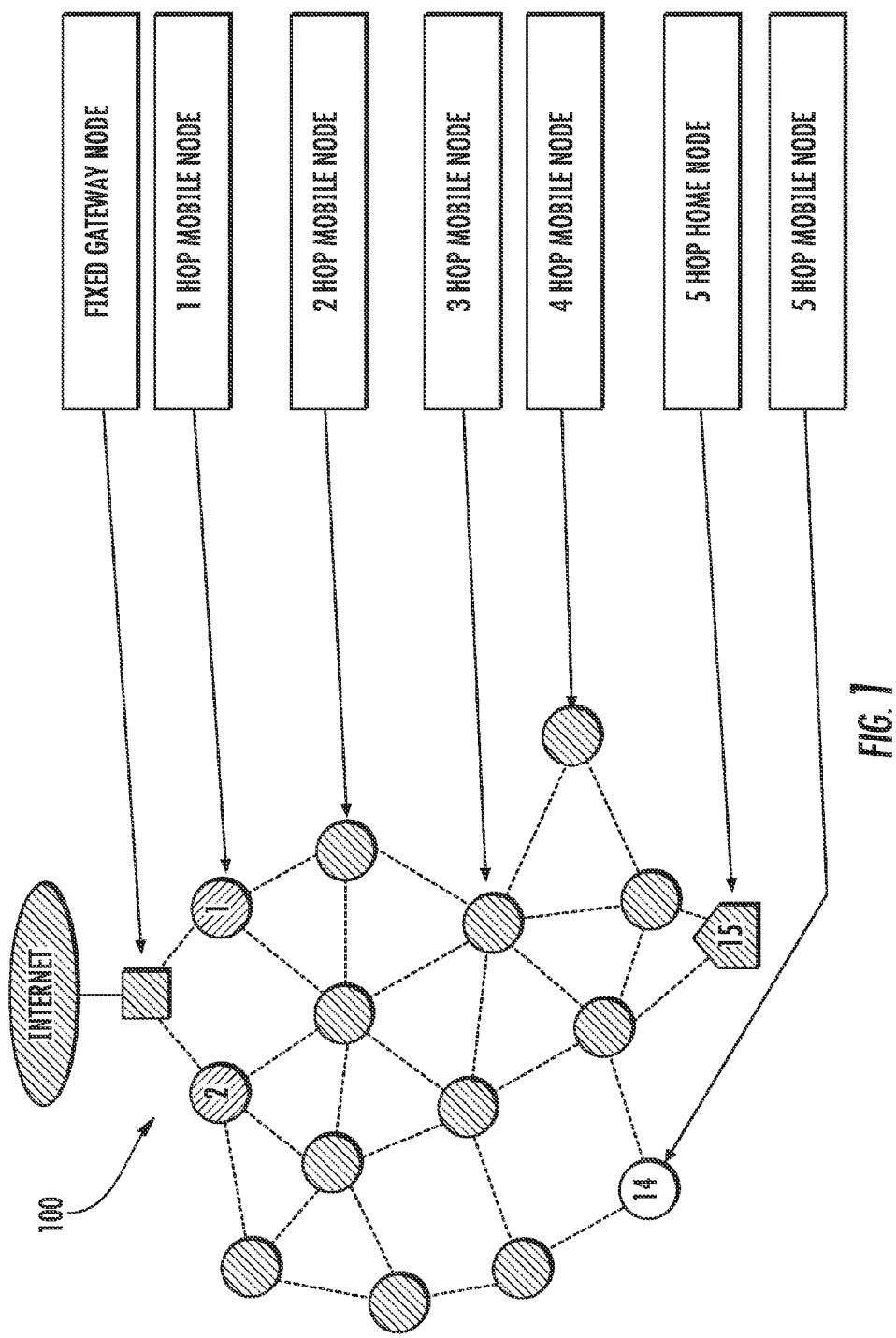
FIG. 1 is a schematic diagram of a network with one fixed gateway node according to a first embodiment.

An exemplary network 100 is illustrated in FIG. 1. The network 100 includes a fixed gateway node A, a plurality of mobile wireless nodes 1-14, and a home wireless node 15. The fixed gateway node A is connected to an Internet backbone and has wireless transmission and reception capability that allows it to act as an access point for a plurality of wireless nodes. Mobile wireless nodes 1-14 and home wireless node 15 also have wireless transmission and reception capability that allow them to communicate with other wireless nodes in the network and with the fixed gateway node (provided that the fixed gateway node is within range of the wireless transmission and reception system). Each of the mobile nodes 1-14 have the ability to act as routers for other wireless nodes in the network. (In alternative embodiments, only a portion of the mobile nodes have this ability.) The home node 15 does not have the ability to act as a muter for other subscriber nodes in the embodiment of FIG. 1. Although only one home node 15 is illustrated in FIG. 1, it should be understood that there may be a plurality of such home nodes in other embodiments and that some or all of such home nodes may have the ability to act as routers. It should also be understood that, in various embodiments, a particular wireless node, whether it be mobile or fixed, may be configured such that it only acts as a router, only act as a subscriber (i.e., a source or drain of information) or acts as both a router and a subscriber.

As discussed above, the network 100 is an Internet-oriented network. Accordingly, each of the wireless nodes 1-15 can be classified based on the number of hops, or hop count, measured with respect to the fixed gateway node A. Nodes 1 and 2 have a hop count of 1, nodes 3-6 have a hop count of 2, nodes 7-9 have a hop count of 3, nodes 10-13 have a hop count of 4, and nodes 14 and 15 have a hop count of 5.

Each wireless node may have one or more other wireless nodes with which it is directly connected. As used herein, a second node is "directly connected" to a first node when the first node can communicate with the second node using its wireless communication system without requiring any other node to relay messages between the first and second nodes. The set of nodes that are directly connected to a node form the neighborhood for that node. The neighborhood for any wireless node can include nodes with lower hop counts (upstream nodes), nodes with the same hop count (peer nodes), and nodes with lower hop counts (downstream nodes).

Each of the nodes of the network 100 have at least one neighborhood node. For example, the neighborhood for node 5 includes upstream nodes 1 and 2, peer nodes 4 and 6, and downstream nodes 8 and 9. Every node in the network 100 has at least one upstream node (which may be the fixed gateway node A or another wireless node), and some have a plurality of upstream nodes. At any given time in any particular network, a wireless node may have zero (in which case it is isolated), one or many upstream nodes and may have zero, one or many peer nodes and zero, one or many downstream nodes. Each node will have downstream neighborhood tables (DNTs) and peer tables (PTs) that list each downstream and peer neighbor, respectively, along with the corresponding hop count relative to the fixed gateway node.

Each wireless node will also have an upstream routing table (URT) which will include the fixed gateway node with which the URT is associated and all upstream nodes (nodes with lower hop counts) in that node's neighborhood. The URT will also include a hop count for each of the neighboring nodes listed in the URT. Exemplary URTs for nodes 1, 5, and 8 are provided in Tables 1, 2 and 3 below.

TABLE 1

URT for Node 1

| Node | Hop Count |
|------|-----------|
| A | 1 |

TABLE 2

URT for Node 5

| Node | Hop Count |
|------|-----------|
| 1 | 1 |
| 2 | 1 |

TABLE 3

URT for Node 8

| Node | Hop Count |
|------|-----------|
| 4 | 2 |
| 5 | 2 |

The PT for a node will have a format similar to that of the URT, but will list peer neighbors rather than upstream neighbors. A detailed discussion of how the URTs and PTs are utilized for routing packets is set forth below.

Each node also has a downstream routing table, or DRT, which the node will utilize in order to determine how to rout packets downstream. The DRT for a node includes each node that is reachable from a node by traveling in a purely downstream direction regardless of the number of hops. In other words, an other node is included in the DRT for a particular node if and only if a path exists from the particular node to the other node, and that path is purely downstream (i.e., each successive node on the path has a higher hop count than the previous node). One result of the foregoing is that routing will always be done through the shortest path as measured by hop count. Another consequence is that the DRT of a node with only upstream and/or peer neighbors will be empty.

Three different types of downstream routing tables may be utilized: DRTs indexed by destination node, DRTs indexed by downstream neighbors, and DRTs double-indexed by both destination node and by downstream neighbors. Examples of the first type of DRT for nodes 1, 2 and 5 and fixed gateway node A are presented below in tables 4-7:

TABLE 4

DRT Indexed by Destination Node for Node 1

| Node | Hop Count | Through Downstream Neighbors |
|------|-----------|------------------------------|
| 4 | 1 | — |
| 5 | 1 | — |
| 8 | 2 | 4, 5 |
| 9 | 2 | 5 |
| 10 | 3 | 5 |
| 11 | 3 | 4, 5 |
| 12 | 3 | 4, 5 |
| 13 | 3 | 4, 5 |
| 14 | 4 | 4, 5 |

TABLE 5

DRT Indexed by Destination Node for Node 2

| Node | Hop Count | Through Downstream Neighbors |
|------|-----------|------------------------------|
| 3 | 1 | — |
| 5 | 1 | — |
| 6 | 1 | — |
| 7 | 2 | 3, 6 |
| 8 | 2 | 5 |
| 9 | 2 | 5, 6 |
| 10 | 3 | 3, 5, 6 |
| 11 | 3 | 5 |
| 12 | 3 | 5 |
| 13 | 3 | 5, 6 |
| 14 | 4 | 3, 5, 6 |

Table 6

DRT Indexed by Destination Node for Node 5

| Node | Hop Count | Through Downstream Neighbors |
|------|-----------|------------------------------|
| 8 | 1 | — |
| 9 | 1 | — |
| 10 | 2 | 9 |
| 11 | 2 | 8 |
| 12 | 2 | 8 |
| 13 | 2 | 8, 9 |
| 14 | 3 | 8, 9 |

TABLE 7

DRT Indexed by Destination Node for Fixed Gateway Node A

| Node | Hop Count | Through Downstream Neighbors |
|------|-----------|------------------------------|
| 1 | 1 | — |
| 2 | 1 | — |
| 3 | 2 | 2 |
| 4 | 2 | 1 |
| 5 | 2 | 1, 2 |
| 6 | 2 | 2 |
| 7 | 3 | 2 |
| 8 | 3 | 1, 2 |
| 9 | 3 | 1, 2 |
| 10 | 3 | 1, 2 |
| 11 | 4 | 1, 2 |
| 12 | 4 | 1, 2 |

TABLE 7-continued

DRT Indexed by Destination Node for Fixed Gateway Node A

| Node | Hop Count | Through Downstream Neighbors |
|------|-----------|------------------------------|
| 13   | 4         | 1, 2                         |
| 14   | 5         | 1, 2                         |
| 15   | 5         | 1, 2                         |

Certain aspects of the DRTs listed above are worth noting. First, for all nodes in the DRT that are not directly accessible, the third column of the DRT indicates the directly accessible neighboring nodes through which such non-directly accessible nodes can be reached.

A second aspect of the DRT tables is that not all nodes with higher hop counts that could possibly be reached from a given node are included in the DRT. For example, the DRT for node 2 does not include an entry for node 4 even though node 4 has a higher hop count (2, as compared to a hop count of 1 for node 2) and even though there is a path from node 2 to node 4 through node 5 that does not require any upstream travel. The reason why node 4 is not included in the DRT for node 2 is that the portion of the aforementioned path from node 5 to node 4 is not purely downstream because both node 4 and node 5 have a hop count of 2 (i.e., nodes 4 and 5 are peers). Similarly, node 8 is listed in the DRT for node 2, but no path through node 6 is shown. Again, this ensures that packets will be routed upstream toward the fixed gateway node through the shortest path as measured by hop counts.

A third aspect of the DRT tables is that multiple paths are shown in some instances. For example, the DRT for node 1 shows that node 11 is reachable in three hops via either node 4 or node 5. The choice between possible paths can be made by the node based on a random selection, relative loading of the multiple nodes, or any other technique.

A second type of DRT is indexed by downstream neighbors rather than by destination node. For each downstream neighboring node, the DRT includes a list of all nodes reachable through purely downstream paths along with an associated hop count. This type of DRT is advantageous because its construction is simple—the DRTs of downstream neighboring nodes are simply concatenated. However, this type of DRT requires a search of the DRT table in order to select a shortest path for a particular destination. Examples of this second type of DRT for nodes 2, 3 and fixed gateway node A are set forth below in Tables 8-10 below:

TABLE 8

DRT Indexed by Downstream Neighbor for Node 2

| Nodes Reachable Through Node 3/HC | Nodes Reachable Through Node 5/HC | Nodes Reachable Through Node 6/HC |
|-----------------------------------|-----------------------------------|-----------------------------------|
| 3/1                               | 5/1                               | 6/1                               |
| 7/2                               | 8/2                               | 7/2                               |
| 10/3                              | 9/2                               | 9/2                               |
| 14/4                              | 10/3                              | 10/3                              |
|                                   | 11/3                              | 13/3                              |
|                                   | 12/3                              | 14/4                              |
|                                   | 13/3                              | 15/5                              |
|                                   | 14/4                              |                                   |
|                                   | 15/5                              |                                   |

TABLE 9

DRT Indexed by Downstream Neighbor for Node 3

Nodes Reachable Through Node 7/HC

7/1
10/2
14/3

TABLE 10

DRT Indexed by Downstream Neighbor for Fixed Gateway Node A

| Nodes Reachable Through Node 1/HC | Nodes Reachable Through Node 2/HC |
|-----------------------------------|-----------------------------------|
| 1/1                               | 2/1                               |
| 4/2                               | 3/2                               |
| 5/2                               | 5/2                               |
| 8/3                               | 6/2                               |
| 9/3                               | 7/3                               |
| 10/4                              | 8/3                               |
| 11/4                              | 9/3                               |
| 12/4                              | 10/4                              |
| 13/4                              | 11/4                              |
| 14/5                              | 12/4                              |
| 15/5                              | 13/4                              |
|                                   | 14/5                              |
|                                   | 15/5                              |

As alluded to above, an advantage of using DRTs indexed by downstream neighboring nodes is that they are easily constructed and updated using information from downstream nodes. Each column of the DRTs above represents the downstream cluster of the corresponding downstream neighbor. The downstream cluster for any particular node can be formed by simply forming the union of each of the columns of the DRT for that node, adding 1 to each of the hop counts in the union, and then adding the particular node along with a hop count of 0. Thus, for example, downstream cluster for node 2 ($DC_2$) is shown below in table 11:

TABLE 11

| $DC_i$ | |
|--------|--|
| 2/0    | Node 2 itself with HC=0 |
| 3/1    | ---------/              |
| 5/1    | / union of columns of   |
| 6/1    | / DRT of Node 2 with    |
| 7/2    | / associated hop counts |
| 8/2    | /                       |
| 9/2    | /                       |
| 10/3   | /                       |
| 11/3   | /                       |
| 12/3   | /                       |
| 13/3   | /                       |
| 14/4   | /                       |
| 15/4   | ---------/              |

As will be discussed in further detail below, the DC for a node is sent by that node to its upstream neighbors in a trigger message.

The third type of DRT is double indexed by both destination and downstream neighbor. An example of this type of double-indexed DRT for node 2 is provided in Table 12 below (where "x" signifies that a route exists between the given node and the destination node corresponding to a row through the downstream neighbor corresponding to a column):

| Destination Node | Nodes Reachable Thru Node 3/HC | Nodes Reachable Thru Node/5 HC | Nodes Reachable Thru Node/6 HC |
|---|---|---|---|
| 3 | x/1 | | |
| 5 | | x/1 | |
| 6 | | | x/1 |
| 7 | x/2 | | x/2 |
| 8 | | x/2 | |
| 9 | | x/2 | x/2 |
| 10 | x/3 | x/3 | x/3 |
| 11 | | x/3 | |
| 12 | | x/3 | |
| 13 | | x/3 | x/3 |
| 14 | x/4 | x/4 | x/4 |
| 15 | | x/4 | x/4 |

Double-indexed DRT tables have the advantages of efficiency for both construction and routing. In preferred embodiments, the DRTs are represented as sparse matrices when used with large numbers of nodes.

Figure 2:
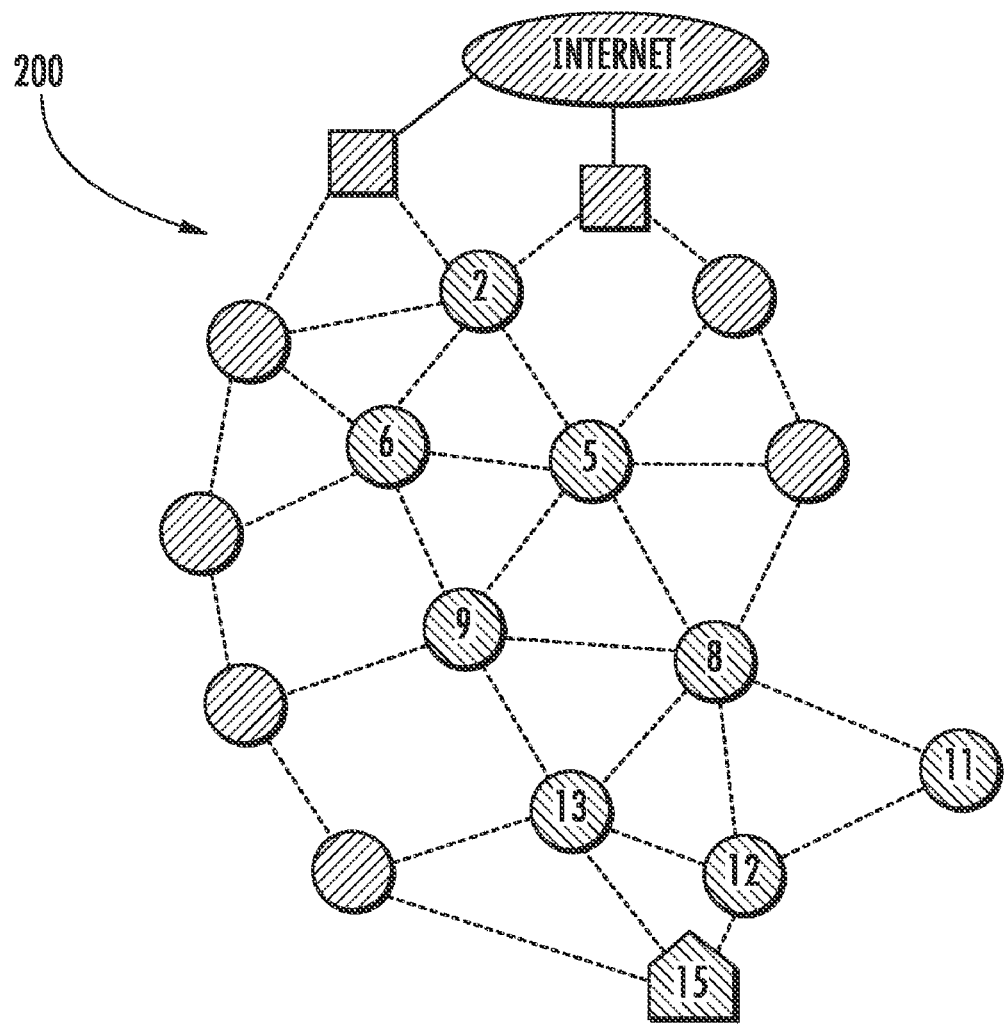
FIG. 2 is a schematic diagram of a network with two fixed gateway nodes according to a second embodiment.
Figure 3B:
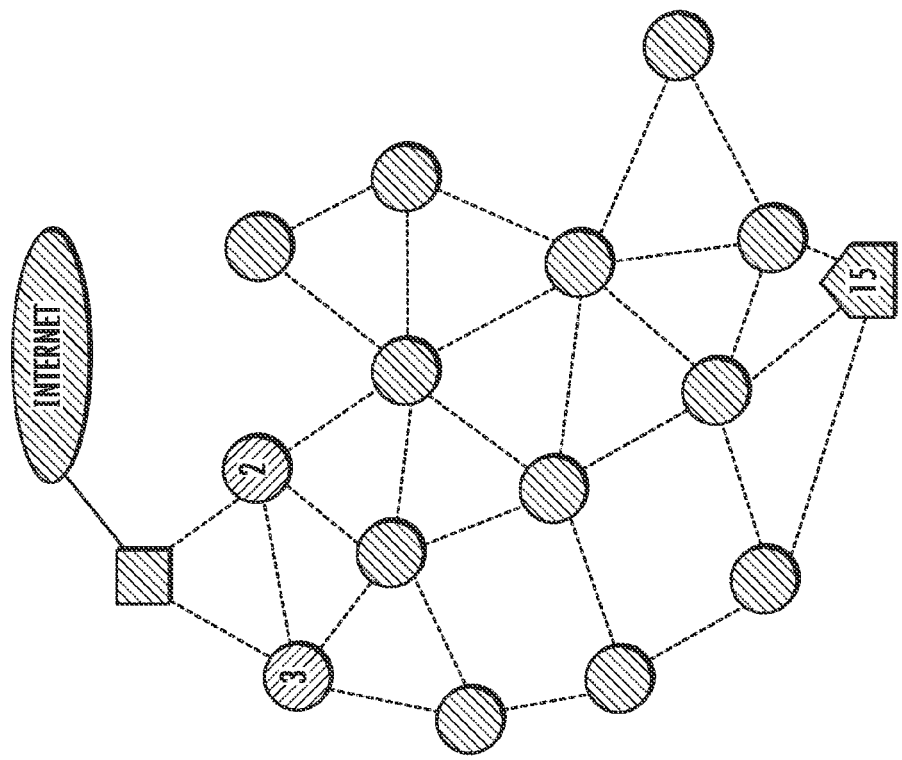
FIGS. 3a and 3b are conceptual schematic diagrams illustrating two superimposed networks that together comprise the network of FIG. 2.
Figure 3A:
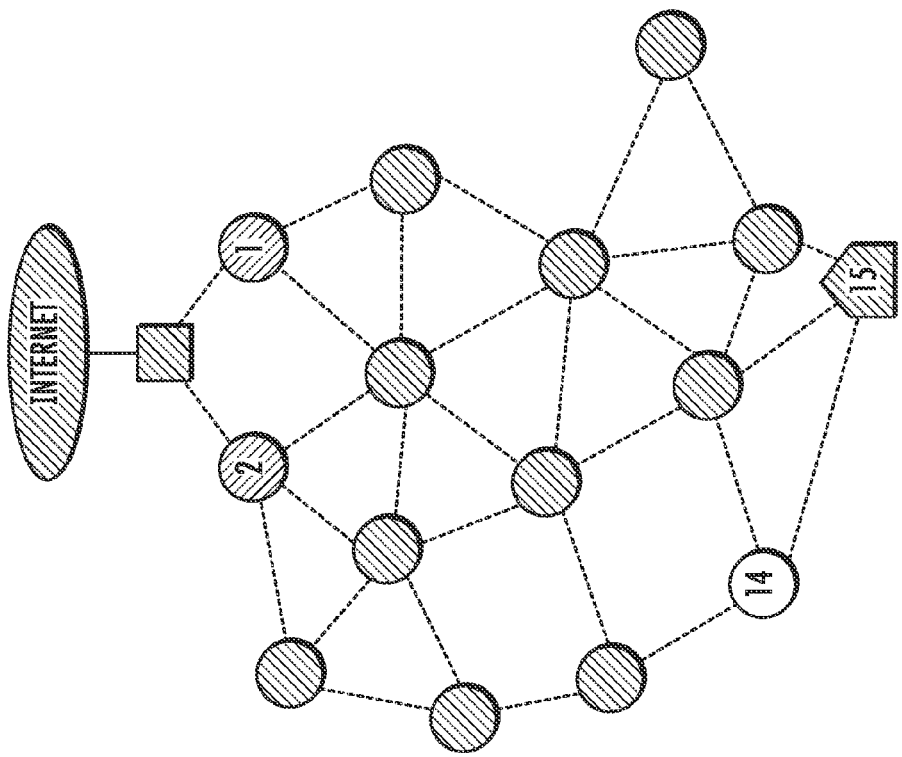

In the network 100 of FIG. 1, there is only a single fixed gateway node A. However, it will be readily apparent that networks sometimes include multiple fixed gateway nodes. An example of a network 200 with the same wireless nodes 1-15 and two fixed gateway nodes A and B is illustrated in FIG. 2. As illustrated in FIGS. 3(*a*) and 3(*b*), the network 200 can be thought of as the superimposition of the two networks 300, 400, one with fixed gateway node A and one with fixed gateway node B. Thus, the methods set forth above with respect to the network 100 of FIG. 1 can be extended to the two fixed gateway node network 200 of FIG. 2 by creating URTs, PTs, and DRTs for each node for each of the individual networks illustrated in FIGS. 3(*a*) and 3(*b*).

Some nodes (e.g., node 1) will have only a single URT because only one fixed gateway node is upstream of that node. Other nodes (e.g., node 3) will have multiple URTs for multiple fixed gateway nodes, but one URT will have a shorter route than the other (node 3 is one hop from fixed gateway node B but is two hops from fixed gateway node A). In this case, the URT corresponding to the shortest distance (smallest number of hops) is designated as the primary URT and the other URT is designated as the secondary URT. The secondary URTs can be used in cases where the path to the primary fixed gateway node associated with the primary URT is blocked. Finally, still other nodes will have multiple URTs with the same minimum distance/hop count. In such cases, both URTs will be designated as primary and both will used for routing purposes. The choice of which of the multiple URTs to use can be based on load balancing, random selection, or some other process.

Maintaining multiple node associations (through primary and secondary URTs or multiple primary URTs as well as in a single URT) is useful and important for three reasons: 1) as a vehicle moves, it may drop its principal association with one fixed gateway node and move to a new one; 2) a failure in part of the network may be recovered by using alternate routing through alternate nodes; and 3) alternate paths may be used for load balancing purposes.

Figure 4:
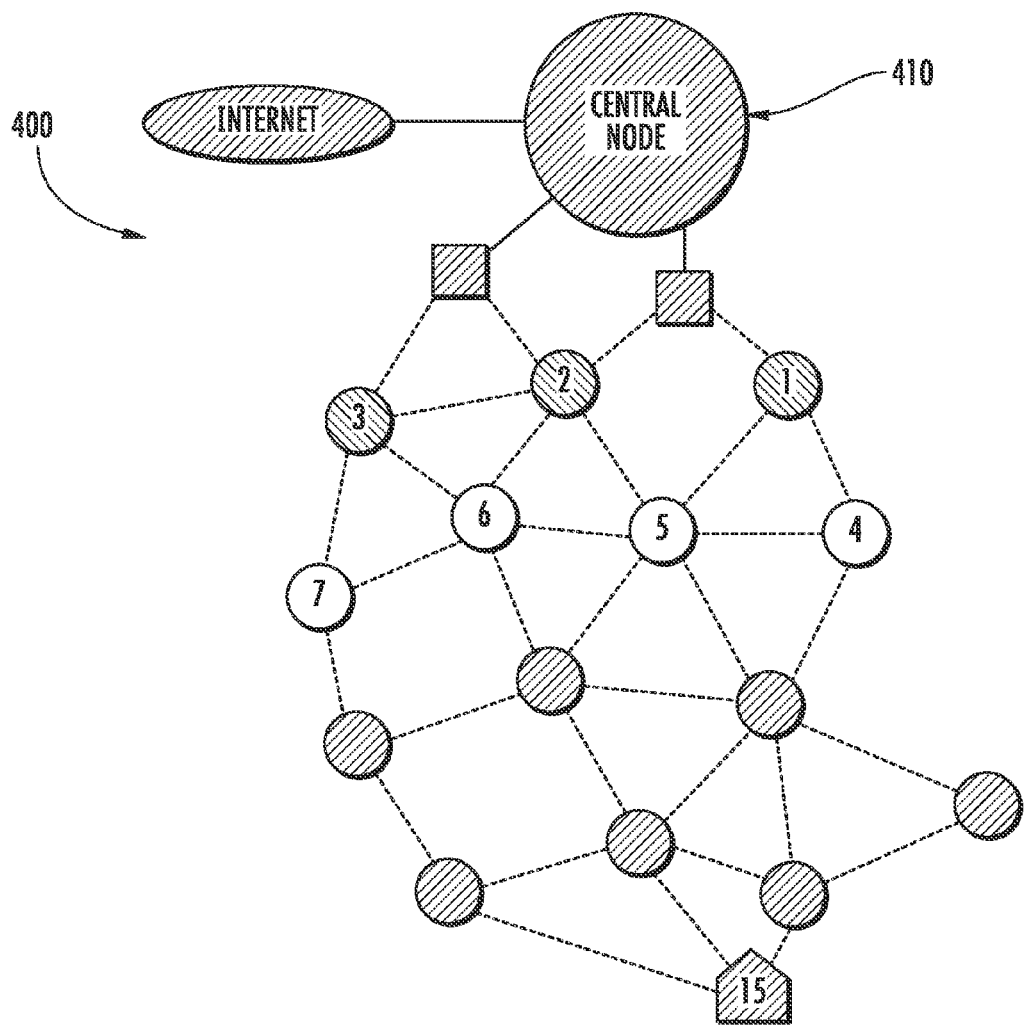
FIG. 4 is a schematic diagram of a network with fixed gateway nodes routed through a central node according to a third embodiment.

In the network 200 illustrated in FIG. 2, node 3 is only associated with fixed gateway node B and node 1 is only associated with fixed gateway node A. Also, node 3 is not in either the DRT or the URT for node 1, and vice-versa. One way in which to effect communications between these nodes is via the Internet. However, in other embodiments of the invention, the fixed gateway nodes are linked to a central node which is then connected to the Internet. An example of such a network 400 with fixed gateway nodes A and B linked to central node 410 is illustrated in FIG. 4. In such an embodiment, the central node 410 has a downstream routing table for each of the fixed gateway nodes and each of the wireless nodes in the network. Exemplary DRTs are set forth in Tables 13 and 14 below (although not shown below, double-indexed DRTs are also possible):

TABLE 13

Central Node DRT with Indexing by Downstream Neighbors

| Target Node | Hop Count | Through Downstream Neighbors |
|---|---|---|
| A | 1 | |
| B | 1 | |
| 1 | 2 | A |
| 2 | 2 | A, B |
| 3 | 2 | B |
| 4 | 3 | A |
| 5 | 3 | A, B |
| 6 | 3 | A, B |
| 7 | 3 | B |
| 8 | 4 | A, B |
| 9 | 4 | A, B |
| 10 | 4 | A, B |
| 11 | 5 | A, B |
| 12 | 5 | A, B |
| 13 | 5 | A, B |
| 14 | 5 | A |
| 15 | 6 | A, B |

TABLE 14

Central Node DRT with Indexing by Destination Nodes

| Nodes Reachable Through A/HC | Nodes Reachable Through B/HC |
|---|---|
| A/1 | B/1 |
| 1/2 | 2/2 |
| 2/2 | 3/2 |
| 4/3 | 5/3 |
| 5/3 | 6/3 |
| 6/3 | 7/3 |
| 8/4 | 8/4 |
| 9/4 | 9/4 |
| 11/5 | 10/4 |
| 12/5 | 11/5 |
| 13/5 | 12/5 |
| 15/6 | 13/5 |
| | 14/5 |
| | 15/6 |

A node associated with multiple fixed gateway nodes A, B, C, etc. will have one set of the URT, PT, DNT and DRT for each of the corresponding fixed gateway nodes A, B, C, etc., respectively.

The routing algorithm from the internet to a subscriber (downstream routing) uses the DRTs to select one of several possible shortest routes to the subscriber. The routing algorithm from a subscriber to the Internet uses the URTs to select one of several possible shortest routes to the Internet. Subscriber to subscriber routing will use both DRTs and URTs. Alternate routing through upstream and downstream neighbors may be chosen in the case of routing failure, for "handover" from one fixed gateway node to another, or for load balancing.

The creation of the routing tables, and hence the network, will now be discussed. The process begins by constructing upstream routing tables. Initially, all wireless nodes have an infinite hop count, no neighbors, and empty URTs, and fixed gateway nodes have a zero hop count, no downstream neighbors and empty DRTs. As wireless nodes detect other nodes (which may be accomplished through periodic broadcast polling messages), the other wireless nodes are registered into that node's PT with an equal infinite hop count. As the fixed gateway nodes detect directly connected wireless nodes, those wireless nodes are assigned a hop count of 1. The wireless nodes detected by the fixed gateway node then propagate the information concerning the fixed gateway node to other nodes they have previously detected as peers and to new wireless nodes detected thereafter the techniques by which this information is propagated will be discussed in further detail below). In this manner, the upstream hierarchy is established.

The DRT construction process can be triggered in either of two ways: 1) when the process of URT construction reaches nodes without downstream neighbors; or 2) when a node modifies its URT. In addition, events encountered during packet routing operations will also trigger modifications to the routing tables as discussed in further detail below.

Use of the routing tables to perform routing operations will now be discussed with reference to the logic diagram 500 of FIG. 5. The process begins when the next packet arrives at step 510. If the packet is intended for the node at which it is received at step 520, the process is complete and step 510 is repeated. Otherwise, the direction of routing required—upstream, downstream, or subscriber-to-subscriber—is determined. There are several ways in which the routing direction of a packet can be determined. In some embodiments, each node can have separate buffers for upstream, downstream and subscriber-to-subscriber packets. In other embodiments, the routing process determines the direction based on the destination. In still other embodiments, the packets include a flag that indicates the direction. Other techniques will be readily apparent to those of skill in the art and are within the purview of the invention.

If downstream routing is required, subroutine 530 is performed. If upstream routing is required, subroutine 540 is performed. Finally, if subscriber-to-subscriber routing is required, subroutine 550 is performed.

Figure 5:
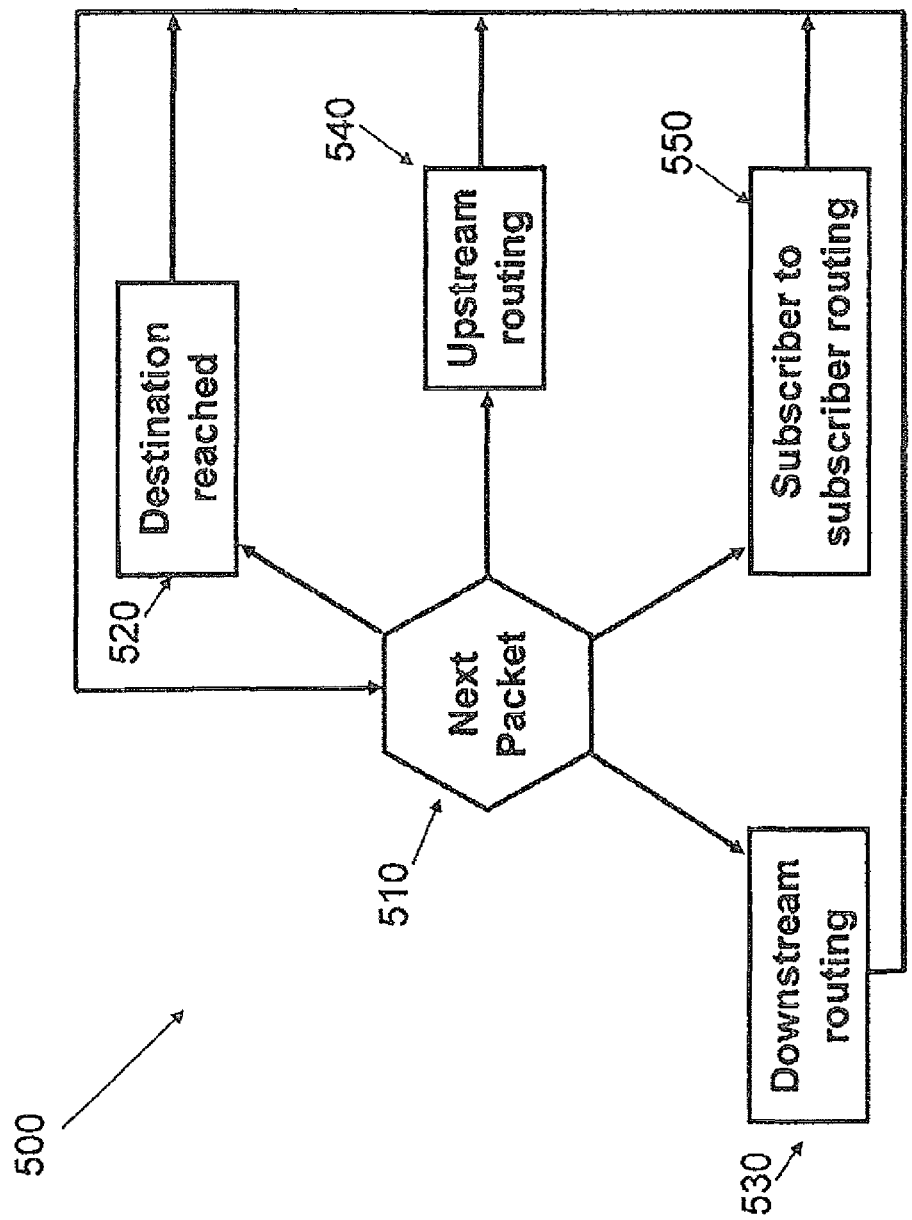
FIG. 5 is a logic diagram illustrating a packet routing process.
Figure 6:
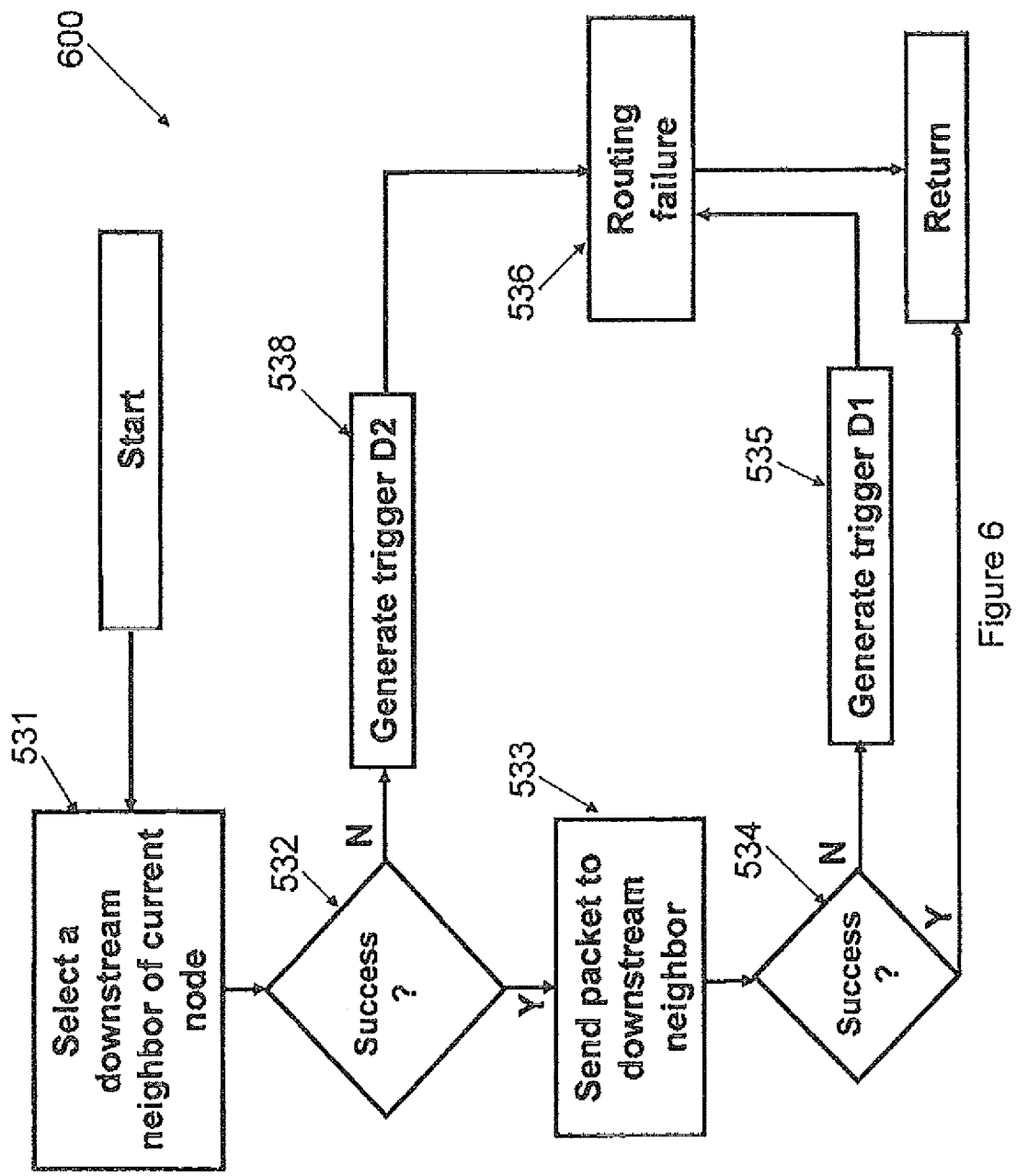
FIG. 6 is a flowchart illustrating in further detail the processing associated with one of the steps of FIG. 5.

The downstream routing subroutine 530 of FIG. 5 is illustrated in further detail in the flowchart 600 of FIG. 6. A downstream neighbor is selected from the DRT at step 531. If the destination node is a downstream neighbor, the packet is transmitted directly to that node. If a destination node is not a downstream neighbor (i.e., is not directly connected) but there is only a single path to that node available, the downstream neighbor node associated with that path is chosen. Otherwise, if multiple paths to the destination node are available, a choice between the available paths is made. The choice can be made any number of ways, including random selection from among the available paths, selection of the first available path found in the routing tables, selection of the least loaded downstream neighbor, etc. As will be discussed further below, peer routing is also possible.

If the selection of a downstream neighbor at step 531 was successful (i.e., a downstream neighbor was found in the routing tables) at step 532, an attempt to transmit the packet to the selected downstream neighbor is made at step 533. If the packet was successfully transmitted to the selected downstream neighbor at step 534, the downstream routing subroutine ends and control returns to step 510 of FIG. 5 for processing of the next packet.

If the attempt at step 533 to transmit the packet to the selected downstream neighbor was unsuccessful at step 534, then a trigger D1 is generated at step 536 and a routing failure procedure is initiated at step 537. Triggers, including the trigger D1, are messages that trigger a routing table update process upon the occurrence of some event. Triggers and the updating of routing tables will be discussed in further detail below. The routing failure procedure of step 637 may be handled in a number of ways. One possibility is that the packet is simply dropped, which will result in the sender failing to receive an acknowledgment from the destination node. Another possibility is to send a failure message to the sending node. This will allow the sending node to send another packet as soon as possible (i.e., without waiting for a timeout for an acknowledgment message). This may be desirable for time-sensitive applications, but there is a performance penalty associated with sending such failure messages. Other possibilities will be apparent to those of skill in the art.

In addition to the trigger D1 of step 536, a second trigger D2 will be generated at step 538 if no downstream neighbor could be located in the DRT at step 531. The D2 trigger occurs because the upstream neighbor's DRT indicated that a path to the destination node was available through a node but that node's DRT does not include the destination node. The processing of the D2 and other triggers will be discussed in further detail below.

Figure 7:
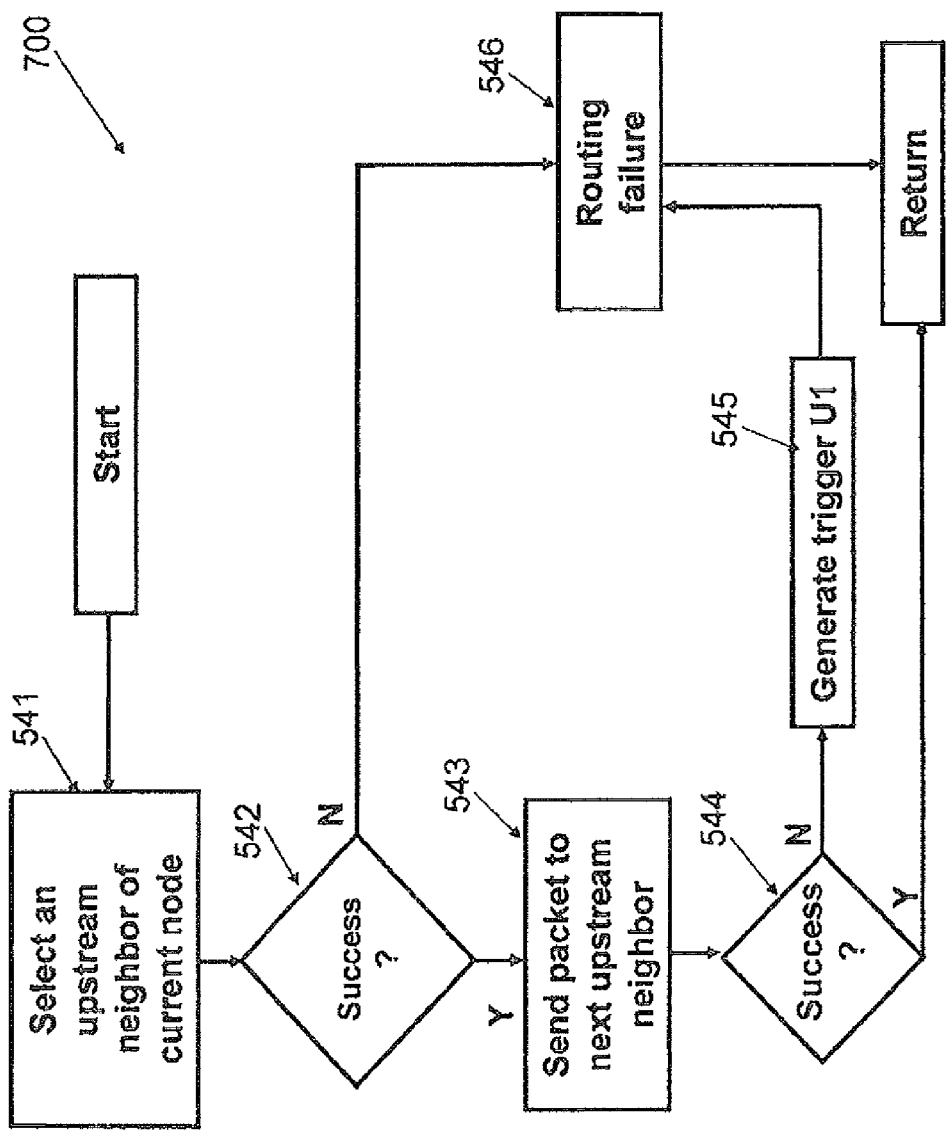
FIG. 7 is a flowchart illustrating in further detail the processing associated with another of the steps of FIG. 5.

The upstream routing subroutine 540 of FIG. 5 is illustrated in further detail in the flowchart 700 of FIG. 7. An upstream neighbor is selected from the URT at step 541. If the destination node is the upstream neighbor, the packet is transmitted directly to that node. If a destination node is not a an upstream neighbor (i.e., is not directly connected) but there is only a single path to that node available, the upstream neighbor node associated with that path is chosen. (Note that this will be the case where the hop count of the receiving node is 1, because the only upstream neighbor that will be fixed gateway node.) Otherwise, if multiple paths to the destination node are available, a choice between the nodes in the URT (excluding the fixed gateway node, which cannot be directly connected if multiple paths exist) is made. As discussed above in connection with the downstream routing process of FIG. 6, the choice can be made any number of ways, including random selection from among the available paths, selection of the first available path found in the routing tables, selection of the least loaded upstream neighbor, etc. Again, peer routing is also possible.

If the selection of an upstream neighbor at step 541 was successful (i.e., an upstream neighbor was found in the routing tables) at step 542, an attempt to transmit the packet to the selected upstream neighbor is made at step 543. If the packet was successfully transmitted to the selected upstream neighbor at step 544, the upstream routing subroutine ends and control returns to step 510 of FIG. 5 for processing of the next packet.

If the attempt at step 543 to transmit the packet to the selected downstream neighbor was unsuccessful at step 544, then a trigger U1 is generated at step 546. Again, the processing of triggers will be discussed in further detail below. After the U1 trigger is generated at step 546, or if an upstream neighbor could not be located at step 542, a routing failure procedure is initiated at step 546. Like the downstream routing failure procedure, the upstream routing failure procedure of step 546 may be handled in a number of ways. One possibility is that the packet is simply dropped, which will result in the sender failing to receive an acknowledgment from the destination node. A second possibility is to send a failure message to the sending node.

The subscriber-to-subscriber routing subroutine 550 of FIG. 5 functions by utilizing a combination of the upstream and downstream routing procedures. When a subscriber node wishes to send a packet to another subscriber node that is not in that node's DRT, the packet is sent using the upstream routing subroutine 540 described above in connection with the flowchart 700 of FIG. 7. When the packet reaches the central node, the central node will send the packet downstream using the downstream routing subroutine 530 described above in connection with the flowchart 600 of FIG. 6.

The routing algorithms discussed above do not use the nodes in the PTs to route packets to peers. Thus, the PTs are only used in the event of changes to the routing tables (e.g., through trigger messages as will be discussed in further detail below). However, as alluded to above, the routing algorithms may be modified to use the PTs. In some embodiments, the PTs are used as alternate upstream routes. In other embodiments, the PTs may be used for downstream routing. In such cases, because peer neighbors do not necessarily include the same subscribers in their DRTs, the construction of the DRTs is modified to include the DRTs of peers as well. This allows for the use of alternate downstream routes through peers whenever available and useful without modification of the downstream routing process.

Triggers will now be discussed in greater detail. As mentioned above, triggers are messages that are generated upon the occurrence of some event that trigger the updating of routing tables at the receiving node. The processing of triggers is handled locally by the node receiving the trigger, and the processing of a trigger may generate another trigger of the same type or of a different type. As discussed above, three triggers—D1, D2 and U1—are generated by the routing algorithms. The processing of these triggers will be discussed in detail.

Figure 8:
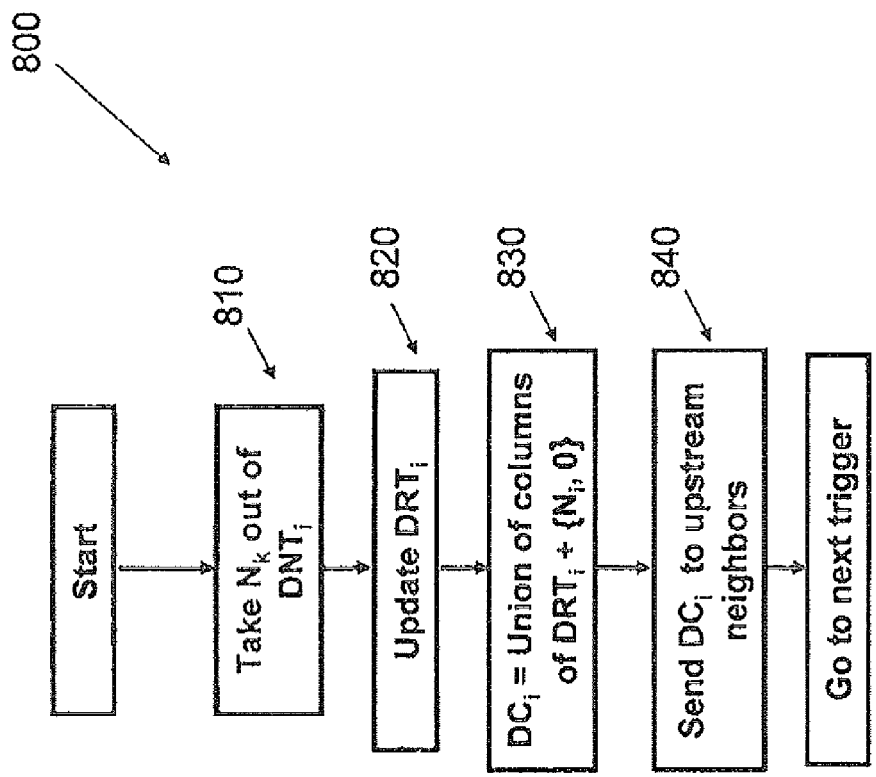
FIG. 8 is a flowchart illustrating the processing associated with a downstream trigger D1.
Figure 26:
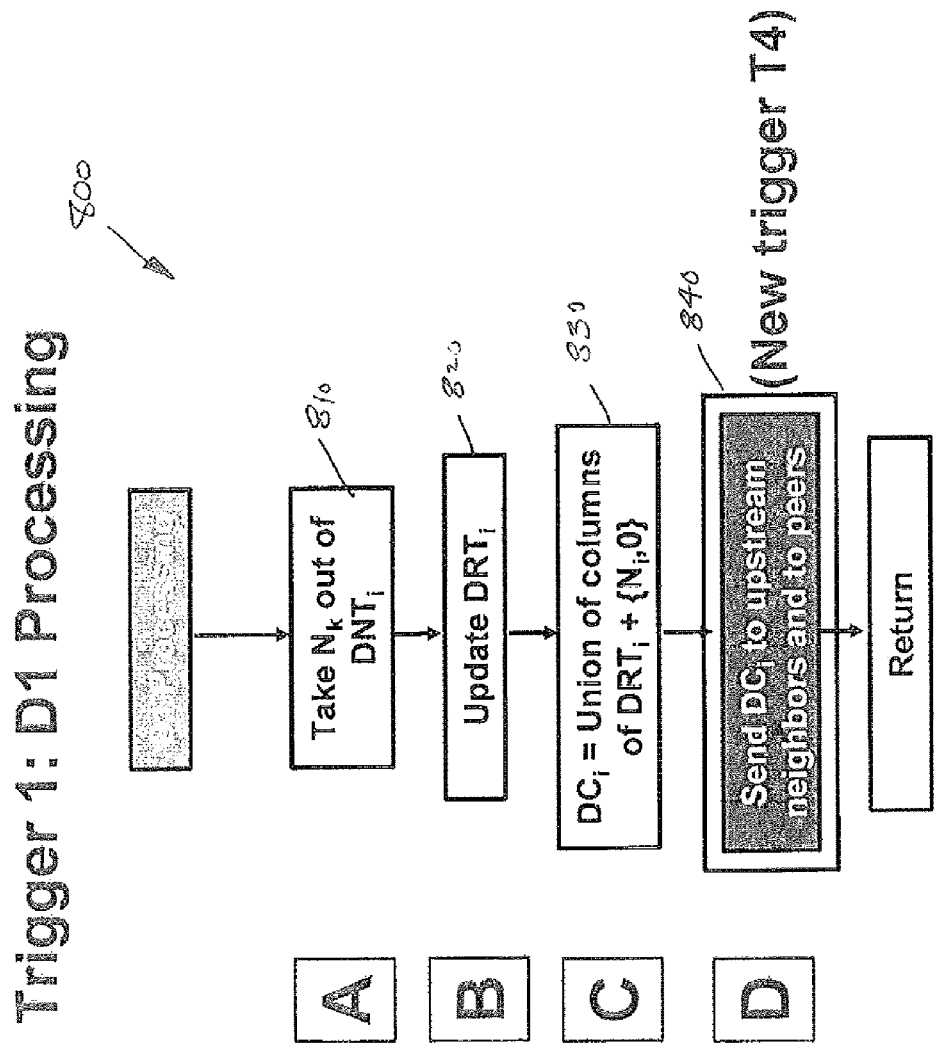
FIG. 26 is a flowchart of D1 signal processing with routing to peers.

Trigger D1 occurs when a packet cannot be sent successfully to a downstream neighbor in a node's DRT. The processing of trigger D1 is shown in the flowchart 800 of FIG. 8. Upon receipt of a D1 trigger, the downstream neighbor $N_k$ to which the packet could not be sent is taken out of the downstream neighborhood table at step 810. If the DRT is of the type indexed by downstream neighbor, the column of the DRT corresponding to the unavailable downstream neighbor is updated at step 820. (In embodiments in which the DRTs are indexed by destination node or are double indexed by destination node and downstream neighbor, appropriate modifications to the network tables are made.) The downstream cluster is then computed at step 830 by calculating the union of the columns of the DRT and adding the node $N_i$ and its hop count 0 (represented symbolically as $\{Ni, 0\}$ in FIG. 8) as discussed above. Next, a T4 trigger message including the downstream cluster is sent to upstream neighbors at step 840 (and to peers in embodiments in which peer routing is implemented) so that these neighbors can update their routing tables. As shown in FIG. 26, the T4 trigger message may be sent to one or more peers as well, and in at least one embodiment, may be sent to all peers at 840. In an embodiment in which the T4 trigger message may be sent to all peers, the system may also include a loop prevention system. The loop prevention system may include providing a T4 signal with a trace along which the T4 propagation passed so that closed propagation loops can be avoided. The process is then complete.

Figure 9:
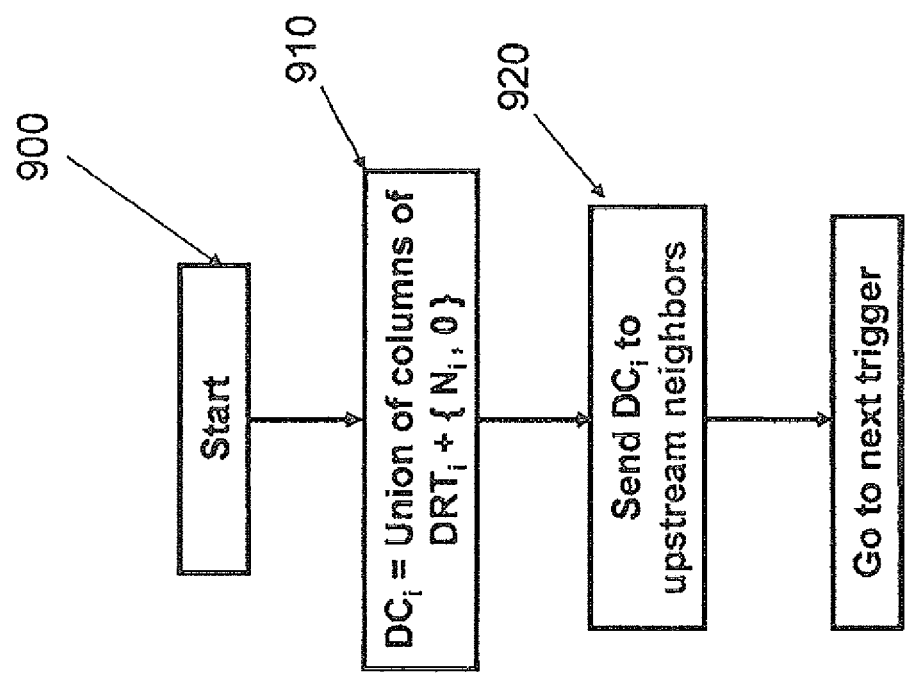
FIG. 9 is a flowchart illustrating the processing associated with a downstream trigger D2.
Figure 27:
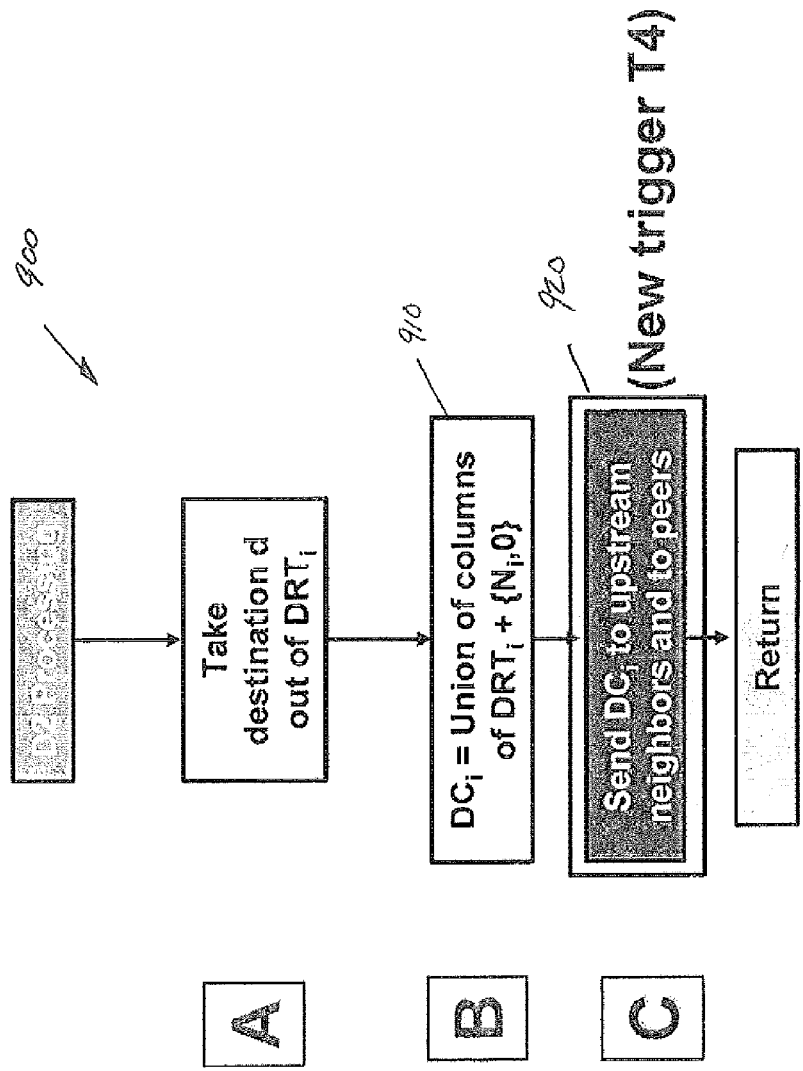
FIG. 27 is a flowchart of D2 signal processing with routing to peers.

Trigger D2 occurs when a packet directed to a destination node is received at a node that does not have the destination node in its DRT. The processing of trigger D2 is shown in the flowchart 900 of FIG. 9. Upon receipt of a D2 trigger, the downstream cluster of the receiving node is calculated at step 910 and a new T4 trigger message including the downstream cluster is sent to upstream neighbors at step 920 to trigger the update of the routing tables of the upstream node that sent the packet. As shown in FIG. 27, the T4 trigger message may be sent to one or more peers as well, and in at least one embodiment, may be sent to all peers at 920. In an embodiment in which the T4 trigger message may be sent to all peers, the system may also include a loop prevention system. The process is then complete.

Figure 10:
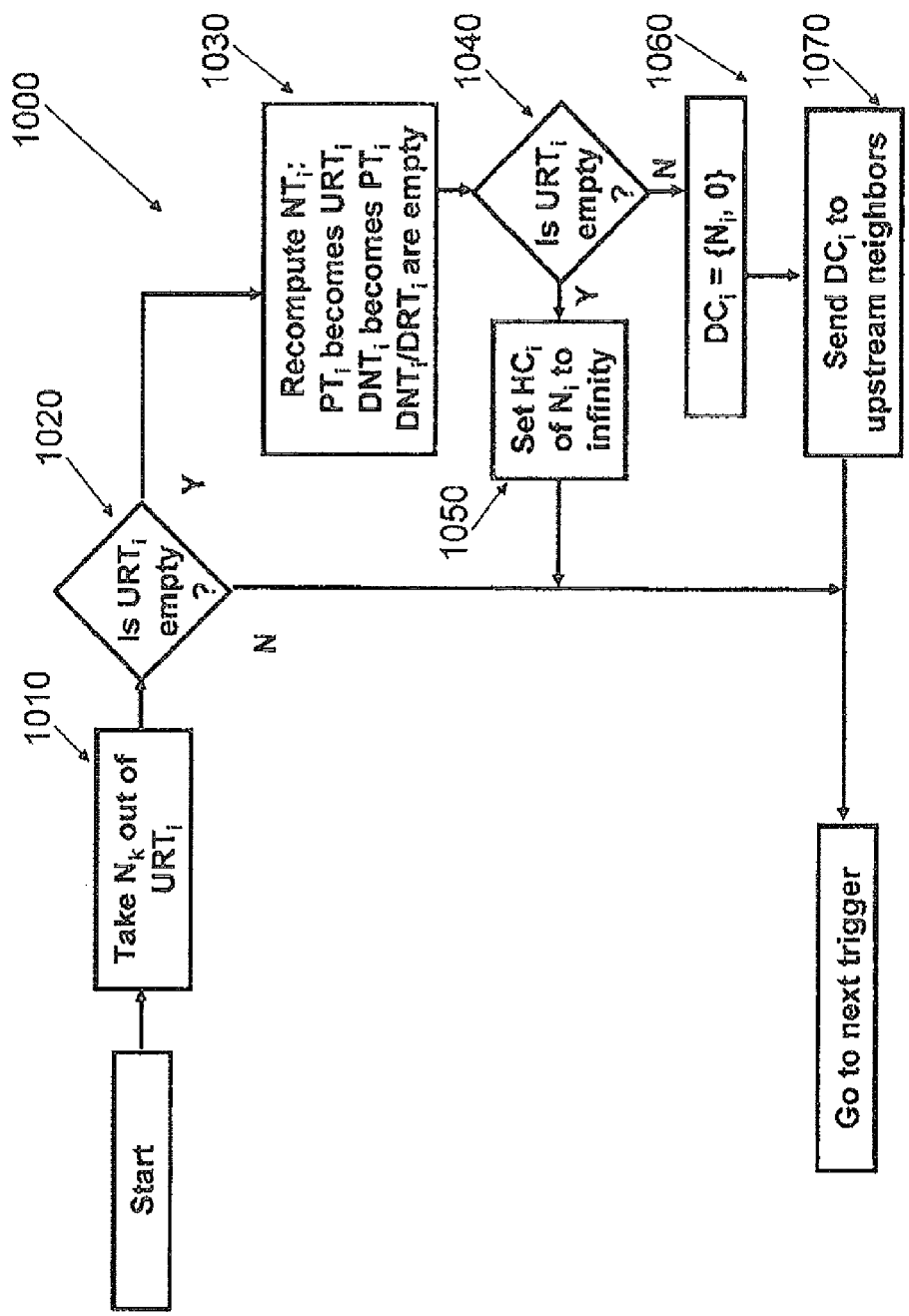
FIG. 10 is a flowchart illustrating the processing associated with an upstream trigger U1.
Figure 28:
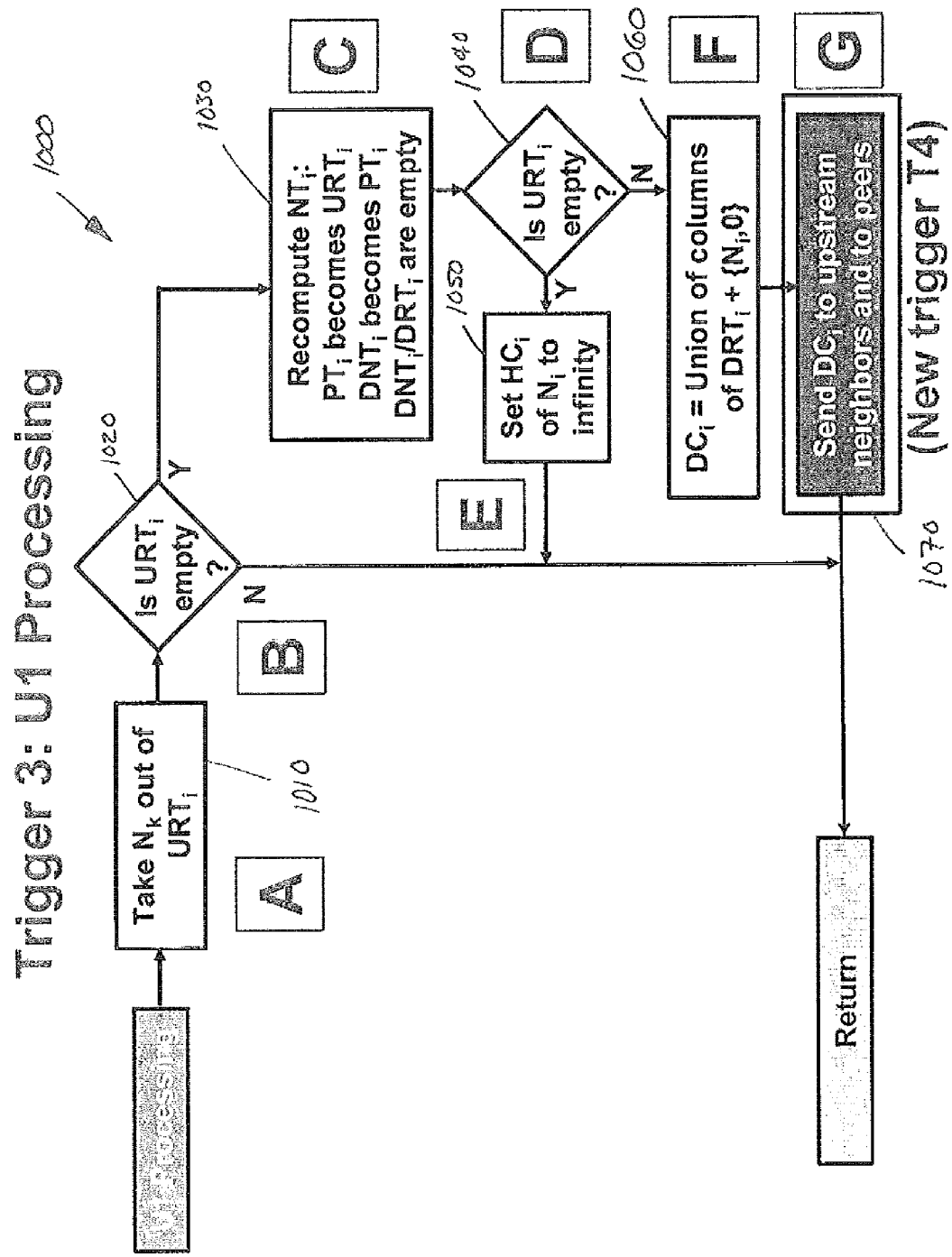
FIG. 28 is a flowchart of U1 signal processing with routing to peers.

Trigger U1 occurs when a packet cannot be sent successfully to an upstream neighbor in a node's URT. The processing of trigger U1 is shown in the flowchart 1000 of FIG. 10. The process begins by removing the upstream neighbor to which the packet could not be sent from the URT for that node at step 1010. If the URT is not empty at step 1020 (meaning there is another upstream neighbor through whom packets can be sent), the process ends. Tithe URT is empty at step 1020, node tables are re-computed at step 1030 as follows; the peer table becomes the upstream routing table, and the downstream neighborhood table becomes the peer table. The downstream neighborhood table and downstream routing tables are then empty. If the URT is still empty at step 1040, the hop count for that node is set to infinity at step 1050 and processing ends. If the URT is not empty at step 1040, the downstream cluster for the node is set to $\{N_i+0\}$ at step 1060 and a T4 trigger message including the downstream cluster is sent to the upstream neighbors in the URT at step 1070 and processing ends. As shown in FIG. 28, the T4 trigger message may be sent to one or more peers as well, and in at least one embodiment, may be sent to all peers at 1070. In an embodiment in which the T4 trigger message may be sent to all peers, the system may also include a loop prevention system.

Figure 11:
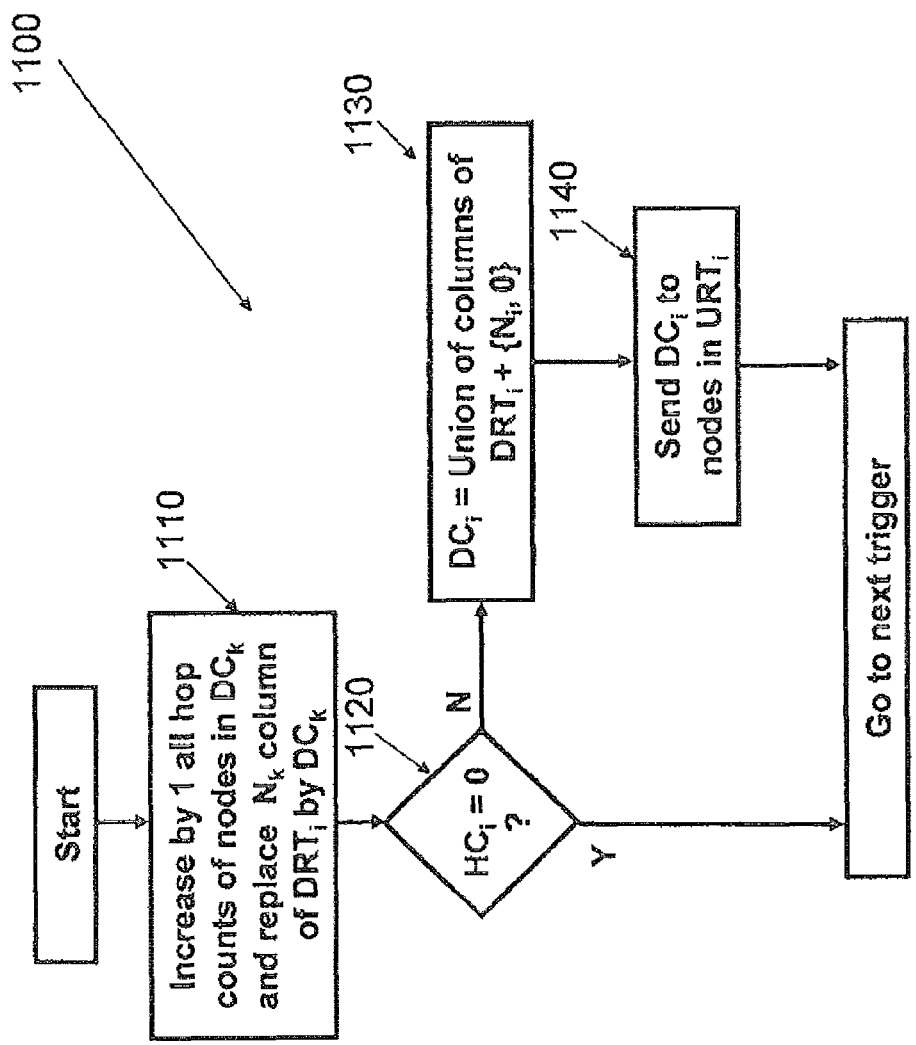
FIG. 11 is a flowchart illustrating the processing associated with a trigger T4.
Figure 29:
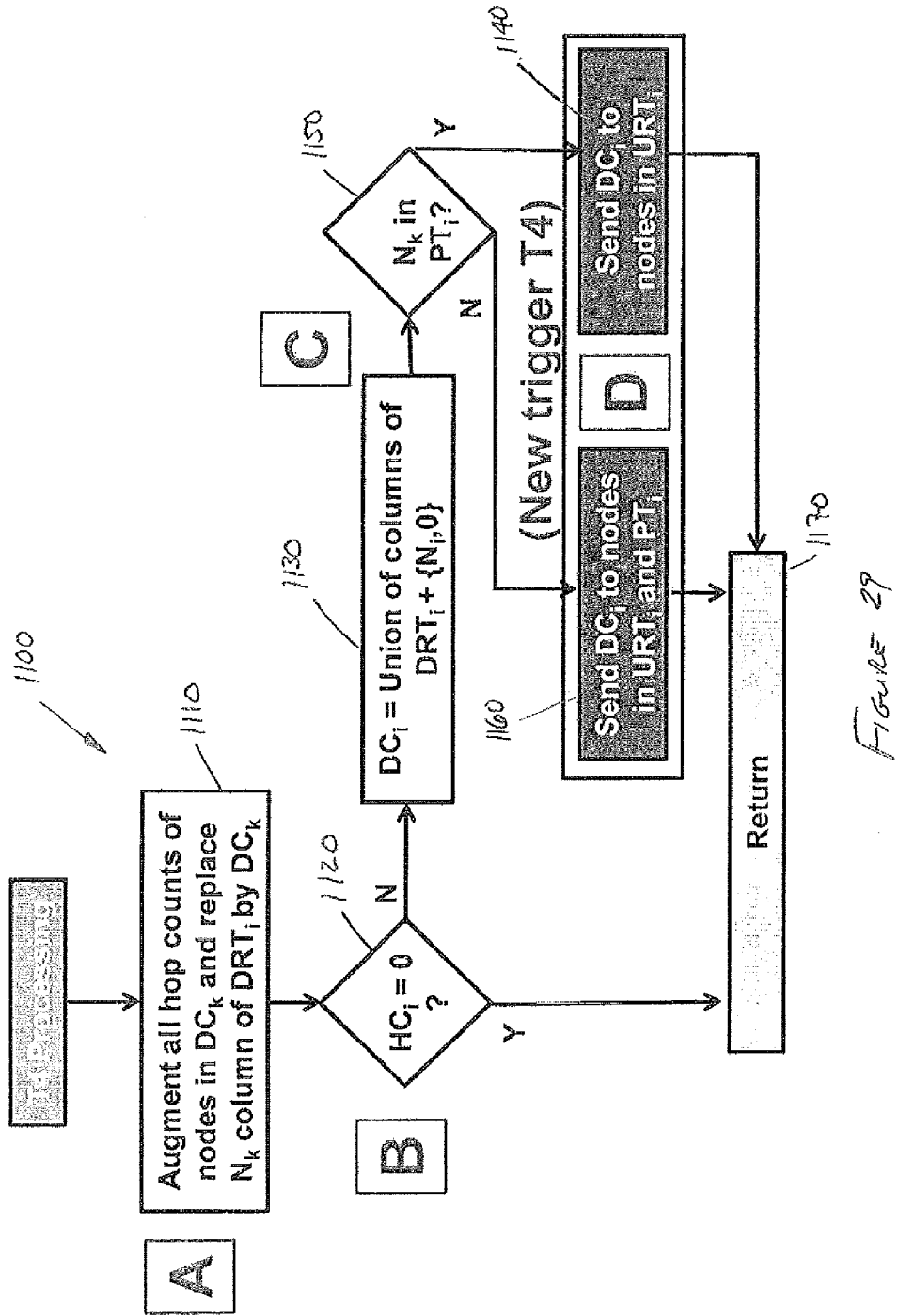
FIG. 29 is a flowchart of a T4 signal processing.

The T4 trigger is generated during the processing of the routing triggers as discussed above. The purpose of the T4 trigger is to propagate downstream connectivity changes to upstream nodes in order to update their DRTs. The processing of a T4 trigger is illustrated by the flowchart 1100 of FIG. 11. The process begins at step 1110 with increasing by 1 the hop counts of the nodes in the received Trigger T4 and updating the downstream routing table which, in embodiments with DRTs indexed by downstream neighbor, involves replacing the corresponding column in the DRT with the new column received in the T4 trigger message. If the hop count for the node is zero at step 1120 (signifying that the highest level node has been reached), the process ends as there are no further upstream nodes. If the hop count is not zero at step 1120 (signifying that there is an upstream neighbor), the downstream cluster is calculated at step 1130 and sent to all upstream nodes in the URT in a new T4 trigger message at step 1140. In another embodiment, as shown in FIG. 29, if Nk is in PTi at 1150, then sending a trigger message T4 including the downstream cluster to upstream neighbors of node Ni in URTi at 1140, and if Nk is not in PTi at 1150, then sending a trigger message T4 including the downstream cluster to upstream neighbors of node Ni in URTi and PTi at 1160 and the process is complete at 1170.

In addition to triggers T1-T4, there is a trigger T5. The T5 trigger is generated by a periodic broadcast. That is, each node periodically broadcasts its node ID and hop count to inform neighboring nodes of its presence. When a broadcast message from another node is received that indicates a change of some kind, the T5 trigger is the mechanism that propagates the change through the network.

Figure 12:
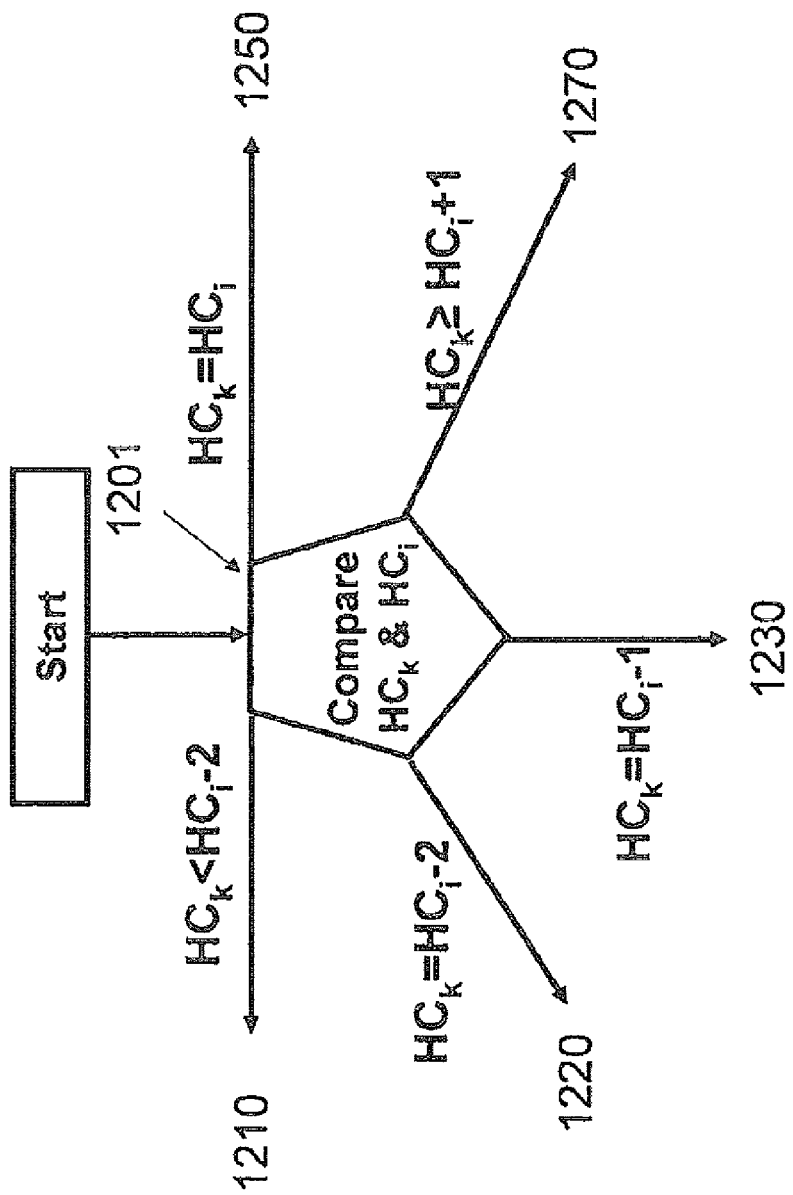
FIG. 12 is a logic diagram illustrating various processing of a trigger T5 depending upon the difference in hop counts between the sending and receiving nodes.

T5 trigger processing is illustrated by the flowchart 1200 of FIG. 12. Processing begins at step 1201, where the hop count of the node receiving the T5 trigger message ($HC_i$) is compared to the hop count ($HC_k$) of the node that sent the T5 trigger message. If the hop count of the receiving node is more than 2 hops downstream of the sending node, the processing at step 1210 is performed. If the hop count of the receiving node is exactly 2 hops downstream of the sending node, the processing of step 1220 is performed. If the hop count of the receiving node is exactly 1 hop downstream of the sending node, the processing of step 1230 is performed. If the hop counts are equal, the processing of step 1250 is performed. Finally, if the receiving node is upstream of the sending node the hop count of the sending node is greater than or equal to the hop count of the receiving node plus one), the processing of step 1270 is performed.

Figure 13:
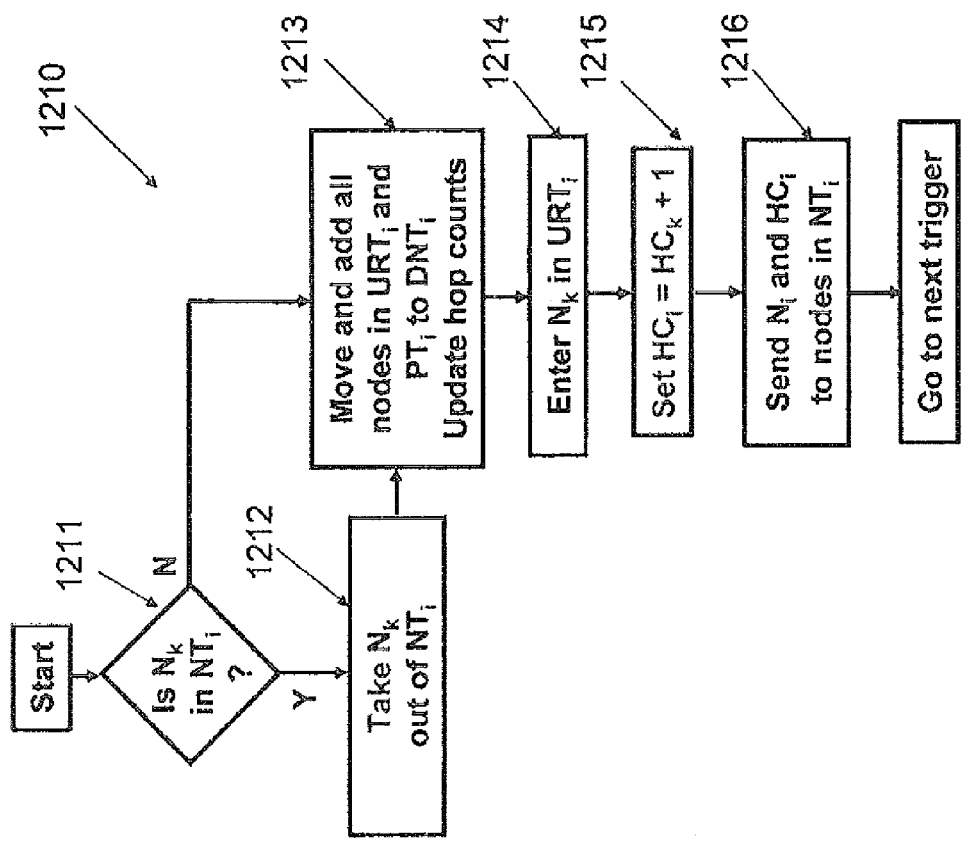
FIG. 13 is a flowchart illustrating in greater detail the processing associated with one of the steps of FIG. 12.

The processing of step 1210 is illustrated in the flowchart of FIG. 13. The process begins at step 1211, where the DNT, URT and PT of the receiving node are searched to determine whether the node ID ($N_k$) of the sending node is listed in any of those tables as being in the neighborhood of the receiving node. If so, the node is taken out of the corresponding table at step 1212. Then, or if the sending node was not in any of the neighborhood tables at step 1211, all nodes in the URT and PT for the receiving node are removed from those tables and added to the downstream neighborhood table DNT and the hop counts in the DNT are set to hop count of the sending node plus 2 at step 1213. The sending node is entered in the URT of the receiving node at step 1214, and the hop count for the receiving nose is set to the hop count of the sending node plus 1 at step 1215. Finally, the node ID and hop count of the receiving node are sent to other nodes in the receiving node's neighborhood in a new T5 trigger message at step 1216 and the process is complete. In other embodiments, the sending of the new T5 trigger message at step 1216 is delayed until the next periodic broadcast. It is also possible to not update the hop counts at step 1213 but rather update them upon receipt of a periodic broadcast message from the neighboring nodes, which will contain the updated hop count after the T5 trigger message is sent to the neighboring nodes at step 1216.

Figure 14:
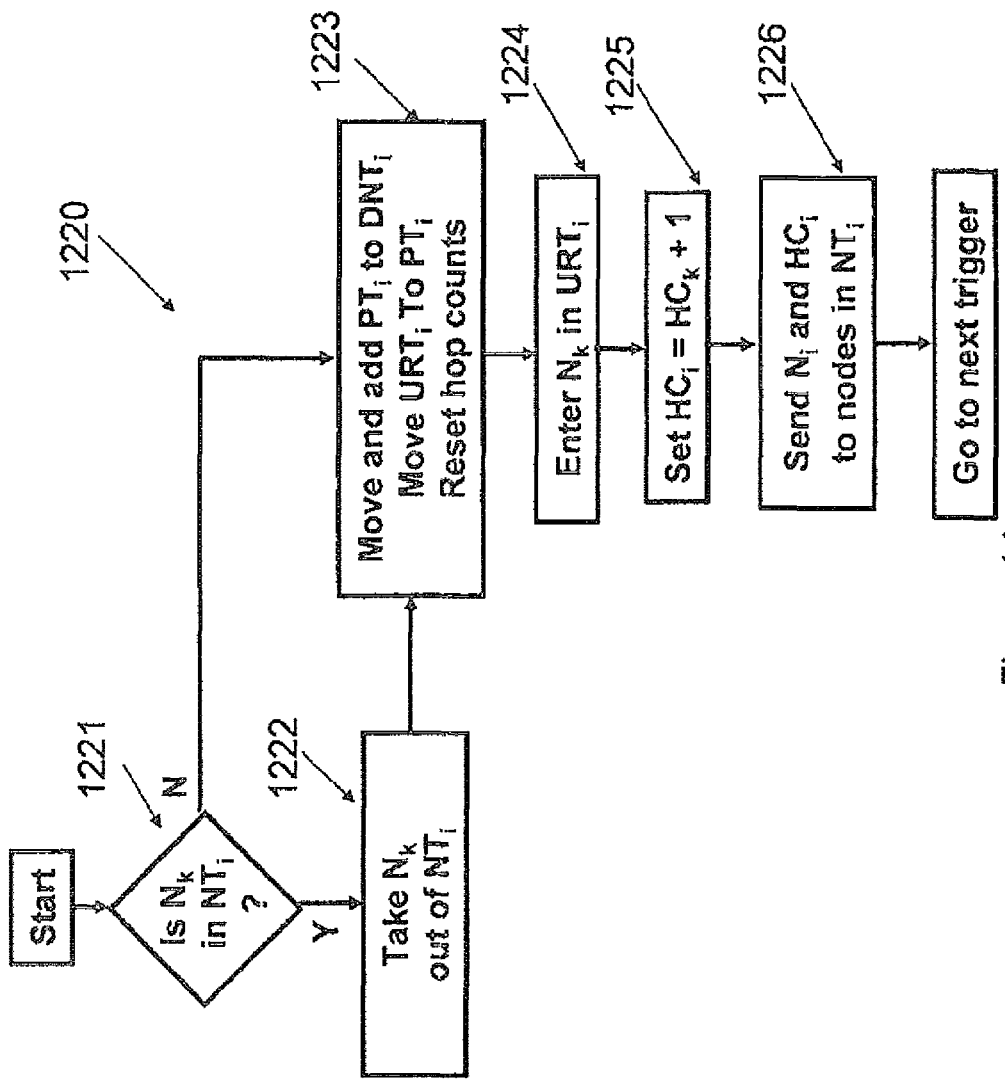
FIG. 14 is a flowchart illustrating in greater detail the processing associated with one of the steps of FIG. 12.

The processing of step 1220 is illustrated in the flowchart of FIG. 14. The process begins at step 1221, where the DNT, URT and PT of the receiving node is searched to determine whether the node ID (N.sub.k) of the sending node is listed in any of those tables as being in the neighborhood of the receiving node. If so, the node is taken out of the corresponding table at step 1222. Next, the PT, DNT and URT are updated at step 1223. The nodes previously listed in the peer table PT are added to the downstream neighbor table DNT, the nodes previously listed in the URT are moved to the PT, and the hop counts are appropriately modified. The sending node is entered in the URT of the receiving node at step 1224, and the hop count for the receiving nose is set to the hop count of the sending node plus 1 at step 1225. Finally, the node ID and hop count of the receiving node are sent to other nodes in the receiving node's neighborhood in a new T5 trigger message at step 1226 and the process is complete. The alternative embodiments and methods discussed above in connection with FIG. 13 are applicable to the processing of FIG. 14 as well.

Figure 15:
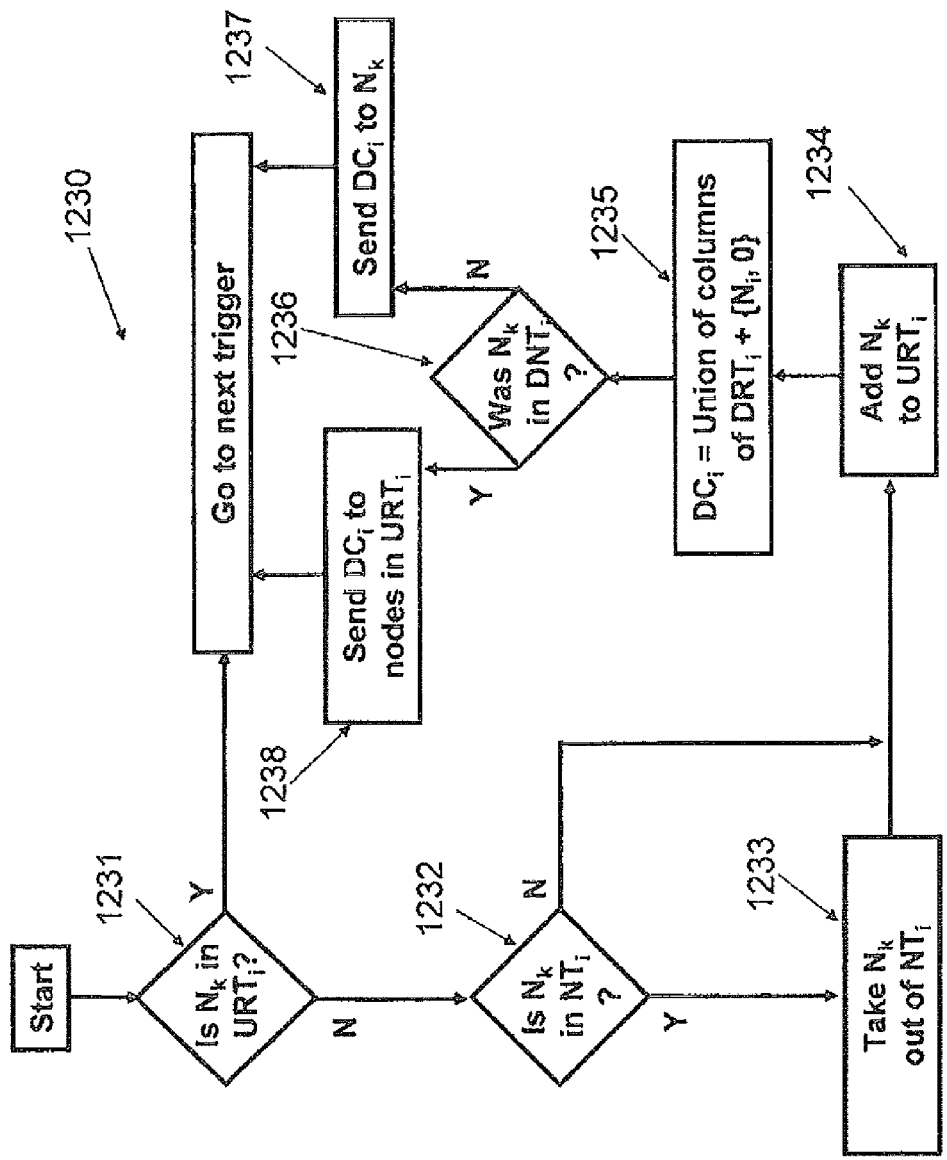
FIG. 15 is a flowchart illustrating in greater detail the processing associated with one of the steps of FIG. 12.

The processing of step 1230 (the hop count of the receiving node is one greater than the hop count of the sending node) is illustrated in the flowchart of FIG. 15. If the sending node is listed in the URT of the receiving node at step 1231, then processing is complete as there has been no change in the relative position of the sending and receiving nodes. If the sending node is not in the URT of the receiving node, then the DNT and PT of the receiving node are checked at step 1232 to determine if the sending node is listed in either of those tables. If so, the sending node is taken out of the corresponding table at step 1233. Next, or if the sending node was not in any of the neighborhood tables at step 1232, the sending node is added to the URT of the receiving node at step 1234 as the sending node has a lower hop count than the receiving node. The downstream cluster of the receiving node is computed at step 1235. Next, a check is made at step 1236 to determine if the sending node was previously listed in the downstream neighborhood table of the receiving node. If so, a T4 trigger message including the downstream cluster is sent to the sending node at step 1237 and processing is complete. If the sending node was not previously listed in the receiving node's downstream neighborhood table at step 1236, the T4 trigger message with the downstream cluster calculated at step 1235 is sent to the nodes in the receiving node's upstream routing table at step 1238 and processing is complete.

Figure 16:
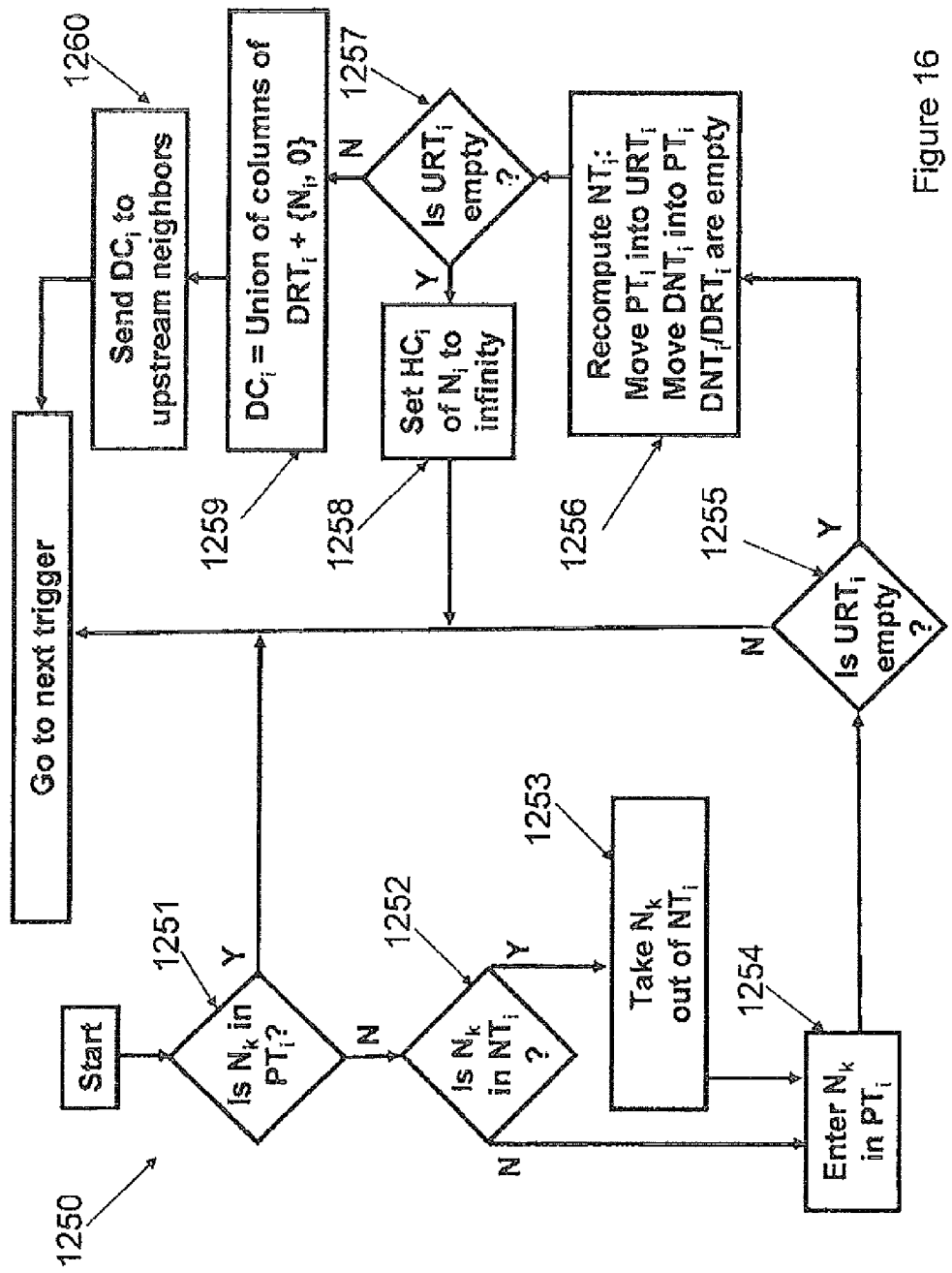
FIG. 16 is a flowchart illustrating in greater detail the processing associated with one of the steps of FIG. 12.

The processing of step 1250 is illustrated in the flowchart of FIG. 16. If the sending node (whose hop count is equal to the receiving node's hop count) is already listed in the peer table of the receiving node at step 1251, then processing is complete as there has been no change in the relative position of the sending and receiving nodes and nothing more need be done. If the sending node is not in the PT of the receiving node at step 1251, then the DNT and URT of the receiving node are checked at step 1252 to determine if the sending node is listed in either of those tables. If so, the sending node is taken out of the corresponding table at step 1253. Next, or if the sending node was not in the peer table at step 1252, the sending node is added to the PT of the receiving node at step 1254. Next, if the URT is not empty at step 1255, processing is complete.

If the URT is empty at step 1255 (meaning that there is no upstream node and hence no way to reach the fixed gateway node), then the three neighborhood tables are re-computed at step 1256. First, the nodes listed in the PT are moved to the URT (i.e., since no upstream node is available, packets destined for the fixed gateway node will be routed through a peer). Then, nodes listed in the downstream neighborhood table are moved to the peer table, and the downstream neighborhood table and downstream routing table are left empty. If the URT is still empty at step 1257 (i.e., there were no peers in the PT), then no path to the fixed gateway node is available and the hop count for the receiving node is set to infinity at step 1258 and processing is complete. If, however, the URT was not empty at step 1257, the downstream cluster is calculated at step 1259 and sent to the upstream neighbors at step 1260 and processing is complete. In an alternative embodiment shown in FIG. 31, if the URT was not empty at step 1257, the downstream cluster is calculated at step 1259 and sent to the upstream neighbors and to at least one peer in a T4 trigger message at step 1260. The T4 trigger message may also be sent to all peers. The network system may also include a loop prevention system to prevent infinite loops from developing.

The T5 trigger discussed above will generally propagate downstream because it is initiated by a new RF association with a fixed gateway node. This downstream propagation will work even when nodes are isolated (i.e., have an infinite hop count) because the comparison between an infinite hop count with a finite hop count will select the processing of step 1210.

Figure 17:
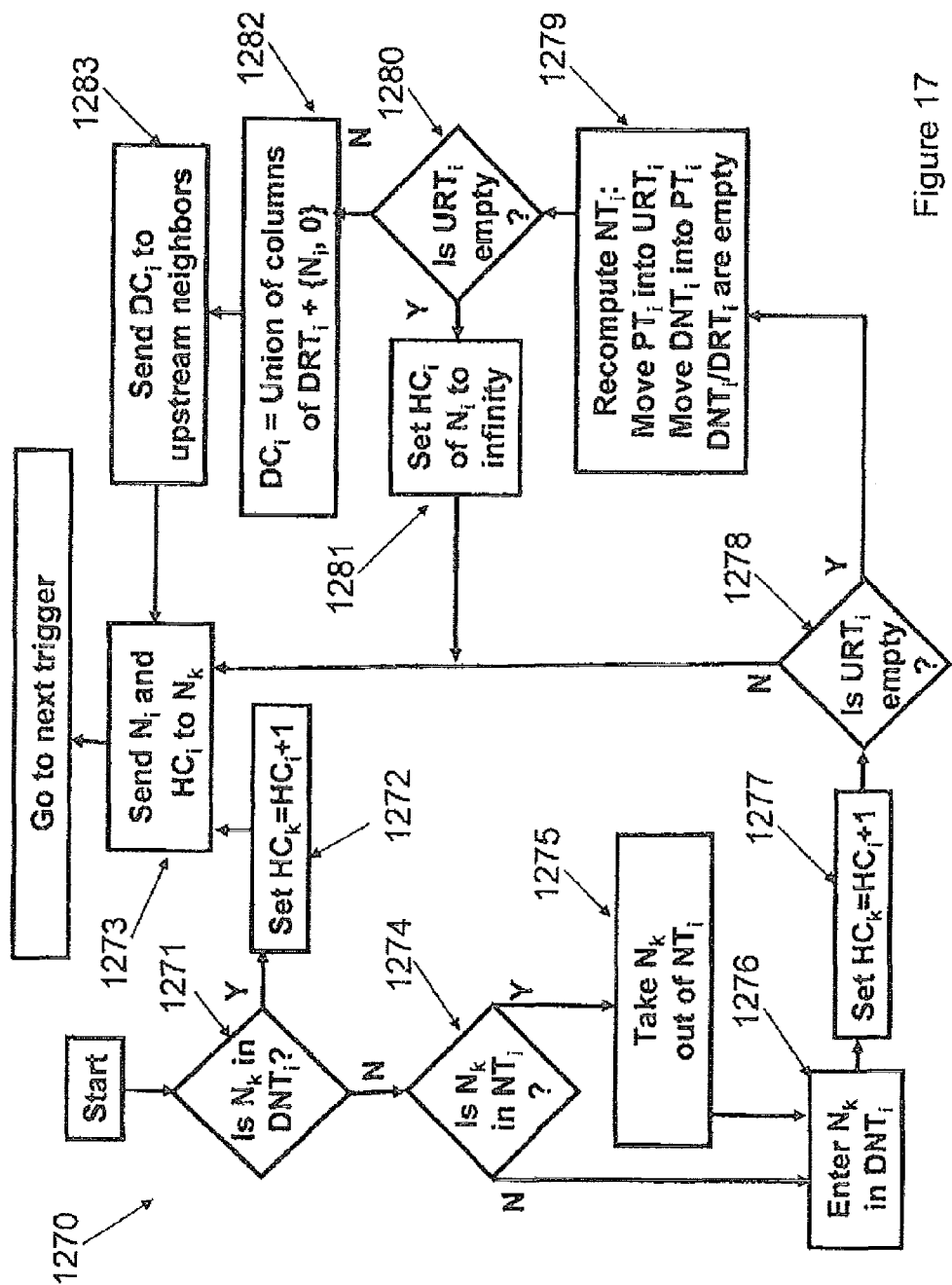
FIG. 17 is a flowchart illustrating in greater detail the processing associated with one of the steps of FIG. 12.

The processing of step 1270 (the hop count of the sending node is at least one greater than the hop count of the receiving node) is illustrated in the flowchart of FIG. 17. If the sending node is already listed in the downstream neighbor table of the receiving node at step 1271, then the hop count of the sending node is set equal to the hop count of the receiving node plus one at step 1272 and a new T5 trigger message including the hop count of the receiving node is sent to the sending node at step 1273 and processing is complete. If the sending node is not in the DNT of the receiving node at step 1271, then the PT and URT of the receiving node are checked at step 1274 to determine if the sending node is listed in either of those tables. If so, the sending node is taken out of the corresponding table at step 1275. Next, or if the sending node was not in the peer table or URT at step 1274, the sending node is added to the downstream neighbor table of the receiving node at step 1276. The hop count of the sending node is set equal to the hop count of the receiving node plus one at step 1277. Next, if the URT is not empty at step 1278, the node identification and hop count of the receiving node are sent to the sending node at step 1273 and processing is complete. It should be noted that, in alternative embodiments, it is also possible to wait for the next periodic broadcast from neighboring nodes to update the hop counts rather than updating the hop counts at step 1256.

Figure 30:
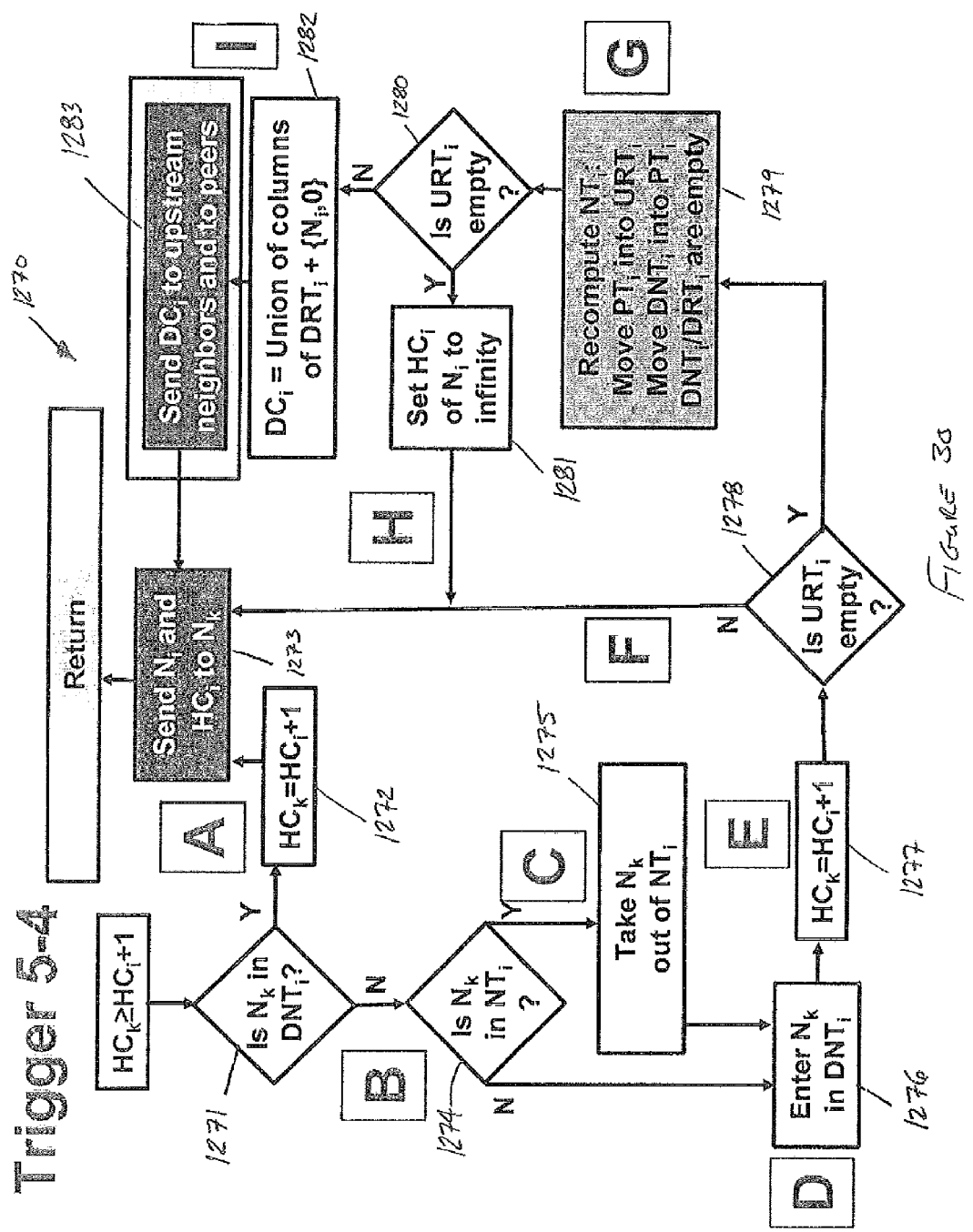
FIG. 30 is a flowchart of T5 signal processing based upon the difference in hop counts between the sending and receiving nodes.

If the URT is empty at step 1278 (meaning that there is no upstream node and hence no way to reach the fixed gateway node), then the three neighborhood tables are re-computed at step 1279. First, the nodes listed in the PT are moved to the URT (i.e., since no upstream node is available, packets destined for the fixed gateway node will be routed through a peer). Then, nodes listed in the downstream neighborhood table are moved to the peer table, and the downstream neighborhood table and downstream network table are left empty. If the URT is still empty at step 1280 (i.e., there were no peers in the PT), then no path to the fixed gateway node is available and the hop count for the receiving node is set to infinity at step 1281 and step 1273 is performed. If, however, the URT was not empty at step 1280, the downstream cluster is calculated at step 1282 and sent to the upstream neighbors in a T4 trigger message at step 1283. In an alternative embodiment shown in FIG. 30, if the URT was not empty at step 1280, the downstream cluster is calculated at step 1282 and sent to the upstream neighbors and to at least one peer in a T4 trigger message at step 1283. The T4 trigger message may also be sent to all peers. The network system may also include a loop prevention system to prevent infinite loops from developing. Then, the node identification and hop count of the receiving node are sent to the sending node at step 1273 and processing is complete. It should be noted that the alternatives discussed above in connection with FIG. 13 (i.e., not updating the hop counts at step 1279 and waiting until the next periodic broadcast to send the hop counts and node IDs rather than sending them at step 1273) are also applicable to this processing.

In addition to the triggers described above, a mechanism to remove obsolete links from the upstream routing table, peer table and downstream network table is necessary. This mechanism can take the form of periodic audits in which all of the nodes in the aforementioned tables are checked periodically. Alternatively, an activity watchdog for each neighbor node can be set up to trigger action if the neighbor node has been idle for too long.

The first mechanism involves periodically auditing the entries for the URT, PT and DNT. In the URT audit, the time since each node in the URT has been heard from is checked. If a node has been silent for more than a threshold period of time, the node is removed from the URT and the processing associated with a T3 trigger (steps 1010-1070 of FIG. 10) is performed. If a peer node in the PT has been inactive for more than a threshold period of time, it is simply removed from the peer table. Finally, in the DRT audit, the time since each node in the DRT has been heard from is checked. If a downstream node in the DRT has been inactive for more than a threshold period of time, the processing associated with a T1 trigger (steps 810-840 of FIG. 8) is performed.

The processing of the second mechanism, activity watchdogs, works in the same fashion described above in connection with the periodic audits whenever an activity watchdog indicates that a node has been idle for more than a threshold period of time.

Any given mobile node will be associated with a growing number of fixed gateway nodes over time as that mobile node moves around. As a practical matter, preferred embodiments maintain only a limited number of associations (e.g., 3) with fixed gateway nodes. In such embodiments, the maintained associations are referred to as principal associations. One way that this can be accomplished is by having a new association replace an old association and trigger its elimination in the neighborhood tables. If a principal association with a fixed gateway node becomes "broken" (i.e., communications with the fixed gateway node become impossible), the association becomes inactive but is still maintained (i.e., it is not dropped as in the case where a new association replaces an old one) as a peer node. It is important to continue maintaining inactive associations because they may become active again (e.g., a mobile unit makes a U-turn or goes around a curve in the road).

In the embodiments described above, a correction in a DRT is immediately propagated upward. Since URT corrections propagate downward, this will create successive waves of DRT update propagation upward as the URT corrections propagate downward. In this manner, infrastructure updates are propagated immediately, which results in fewer mishandled packets. However, this requires more CPU resources. Alternatively, the algorithms discussed herein can be modified so that any upstream propagation of DRT updates only occurs when a node that has modified its DRT has no downstream neighbors. This would delay infrastructure updates, but would be computationally more economical.

In another embodiment, the Internet-oriented mobile ad-hoc network may be formed from one or more nodes that can operate in more than one mode. In particular, one or more of the nodes may be configured to alternate between functioning as a gateway node and functioning as a wireless node. The nodes may also be configured to alternate between operating as a fixed wireless node and a mobile wireless node. Thus, each node in the Internet-oriented mobile ad-hoc network may be a gateway node when the node is able to establish connectivity to the Internet. The nodes may function as set forth above and may include the information set forth above as well. FIG. 19 displays a generalized upstream routing tables (URTs) for a node that can operate in more than one mode.

In at least one embodiment, one or more nodes, which may be designated as node Ni, may be configured to survive in an isolated condition. The node may be configured to survive in an isolated condition until other nodes within the network may be brought back online. A node can be either wireless or fixed, or both. The node may also act as a gateway only, may act as a relay only, or may act as both a gateway and a relay. Alternatively, the node can be isolated where the node is neither a relay not a gateway. A node may be configured to function as a gateway node in communication with the Internet and may be configured to function as a wireless node. The node can play multiple roles at the same time. For instance, the node can participate in multiple connectivity such that the node can in each connectivity play the role of a gateway, of a relay or be isolated where the node is neither a relay nor a gateway. A node may be found in any of the three roles partially or fully simultaneous. However, there are some exceptions: for instance a node cannot be isolated and serve as a gateway. The connectivity between two nodes can be wireless or wired. As such, the system is configured to work in networks that are completely wireless, completely wired or hybrid. As such, the system will accommodate fixed relays which are not gateways. The node may function as a relay for a remote gateway node and may function as a gateway node for other nodes. In a method of handling a failure in an ad-hoc network, the network may include a plurality of nodes, wherein the node Ni may be a wireless node, a fixed node, or both a wireless node and a fixed node. In addition, the node Ni may be a gateway node, a relay node, an isolated node or both a gateway node and a relay node.

The Internet-oriented mobile ad-hoc network may be configured to route signals through peer nodes. In particular, the network may be configured such that one or more nodes may include a peer downstream routing table (PDRT) such that the node will then be able to determine the downstream routing paths that exist downstream of the peer. The node may include PDRTs for peers that are one or more hop counts away. In one embodiment, the node may include PDRTS for all peers of that node. Nodes may independently and periodically receive and process control signals from one or more peer nodes with undated PDRT tables. The network may also include a loop suppression system to prevent formation of endless loops. The network may be configured such that each node in the network includes PDRTs of peer nodes.

Figure 18:
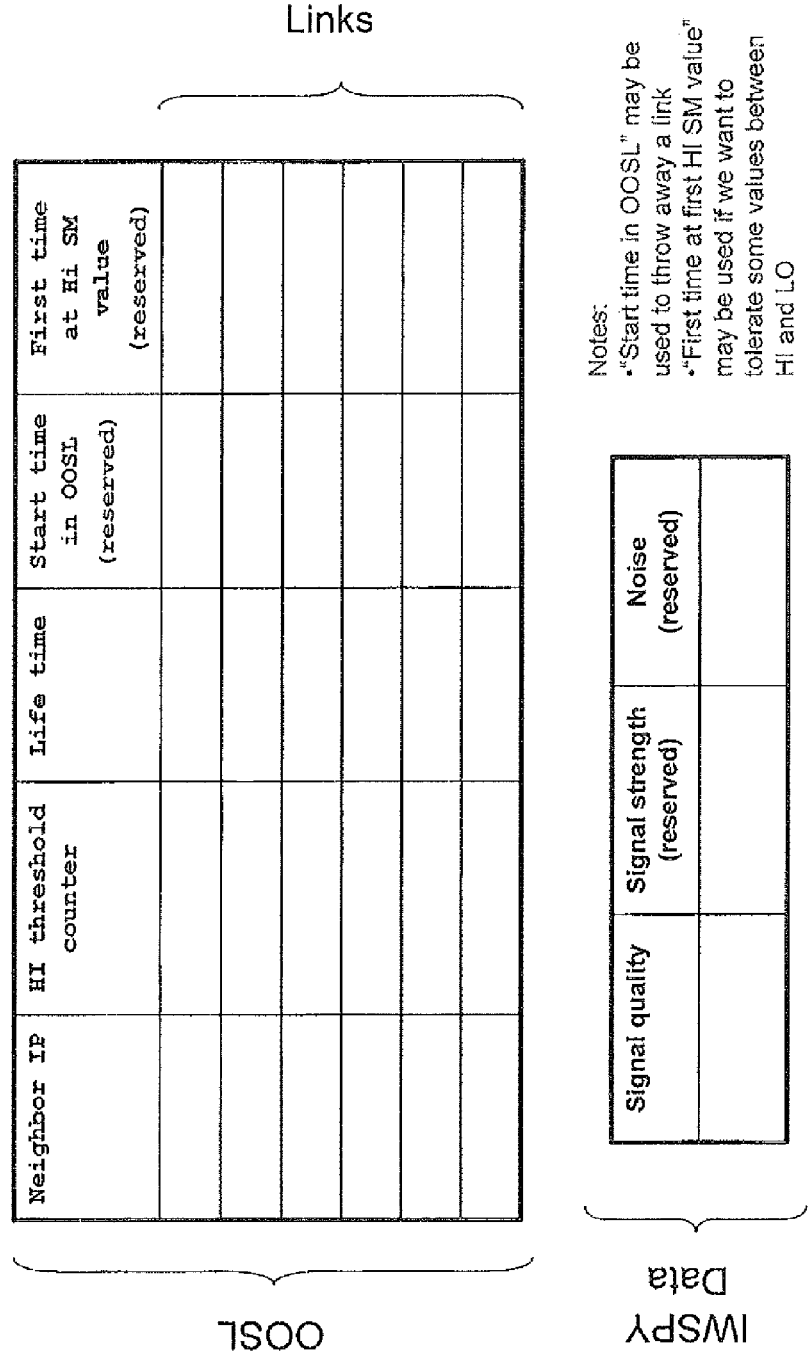
FIG. 18 is an out of service list data structure.

The internet-oriented mobile ad-hoc network may also include an unacceptable links management system configured to maintain a level of service above a particular threshold. The unacceptable links management system may be configured to silence links that are determined to be unacceptable; to return links to service that have been silenced if the links become acceptable or, if the links have been silenced longer than a threshold time period, the links are moved to an out of service list, as shown in FIG. 18; to periodically audit the out of service list to identify links that have service metrics greater than a threshold and returning those links to service; and to cancel links that remain below the threshold for more than a particular period of time.

Figure 21:
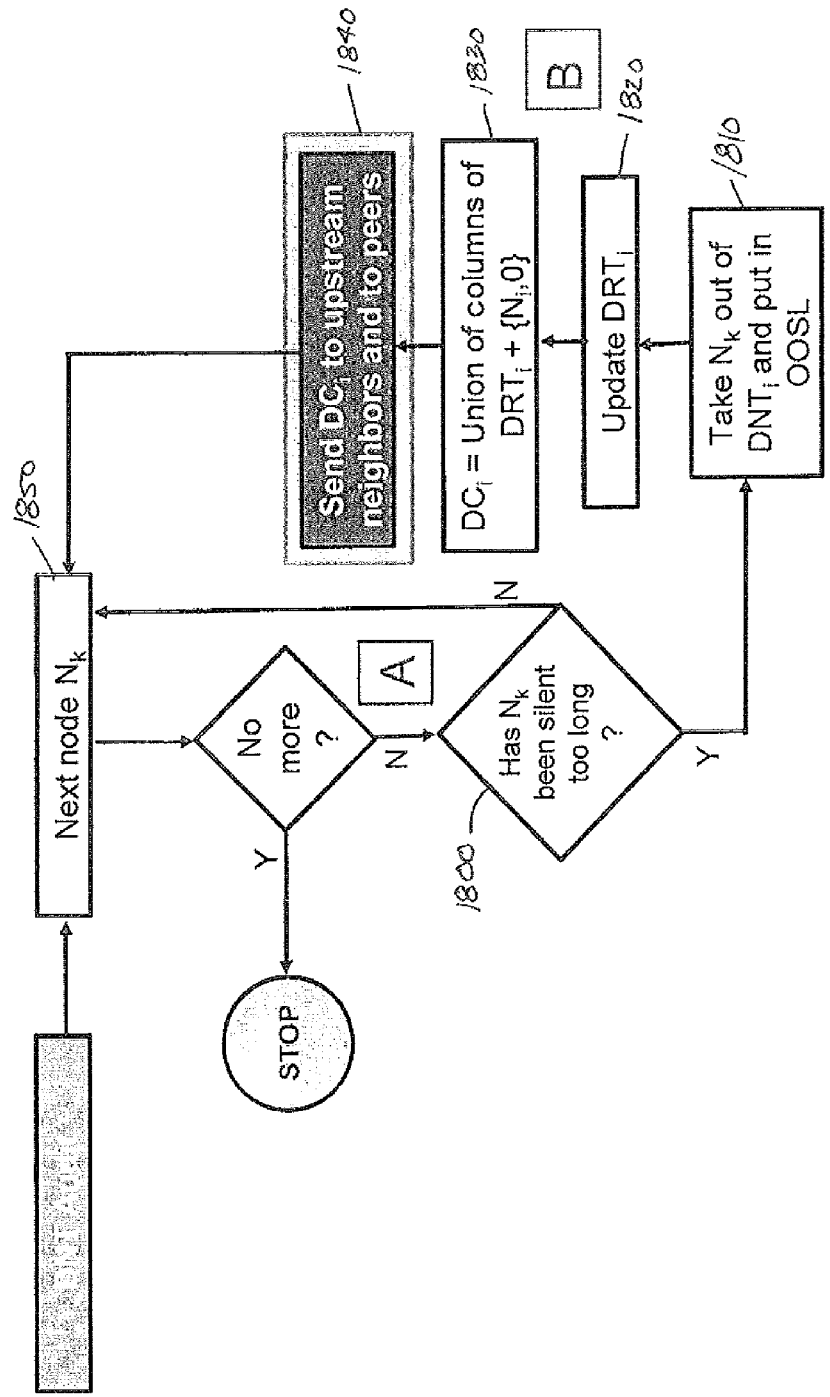
FIG. 21 is a flowchart of a periodic audit for silent nodes in a DNTi.
Figure 22:
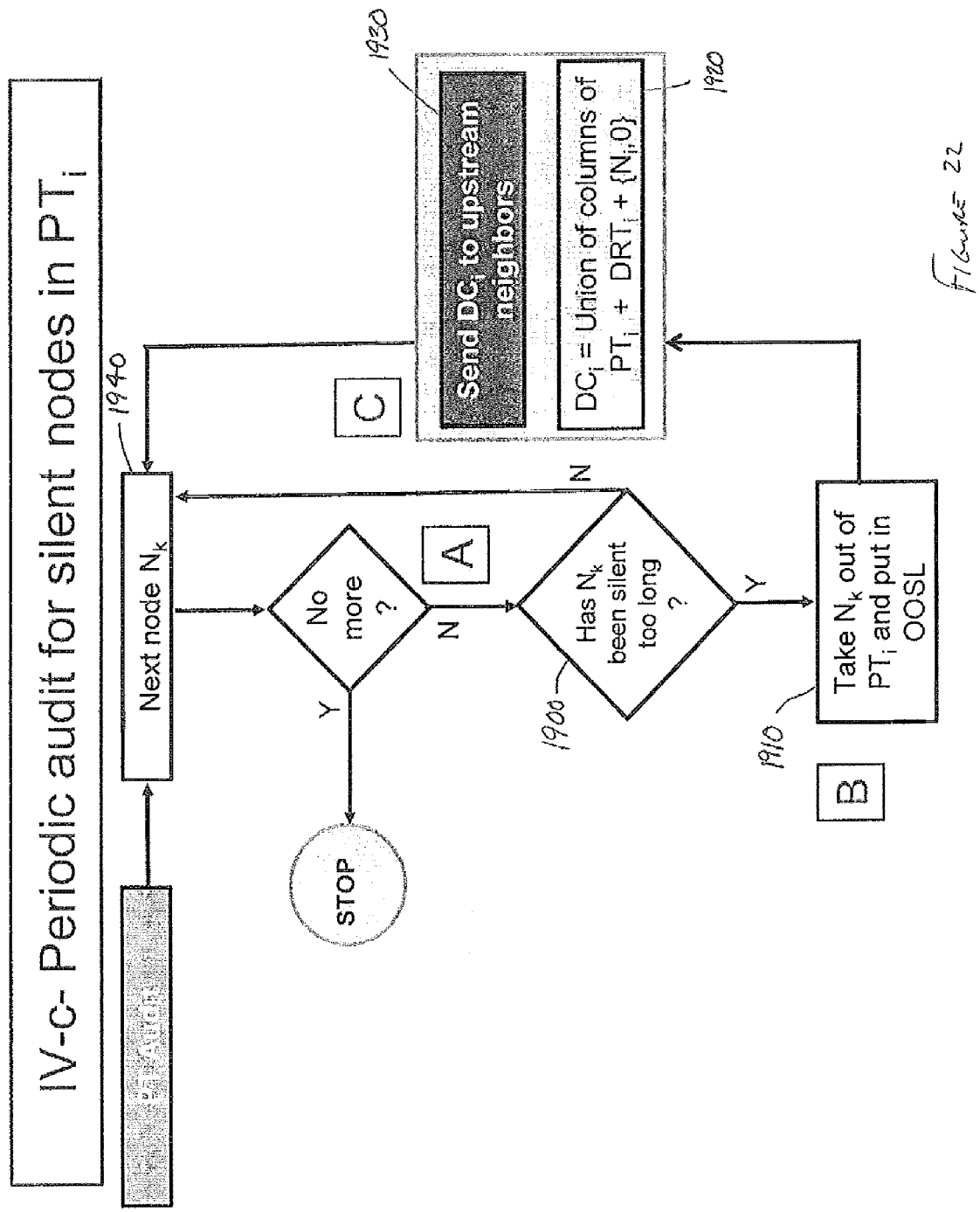
FIG. 22 is a flowchart of a periodic audit for silent nodes in a PTi.
Figure 23:
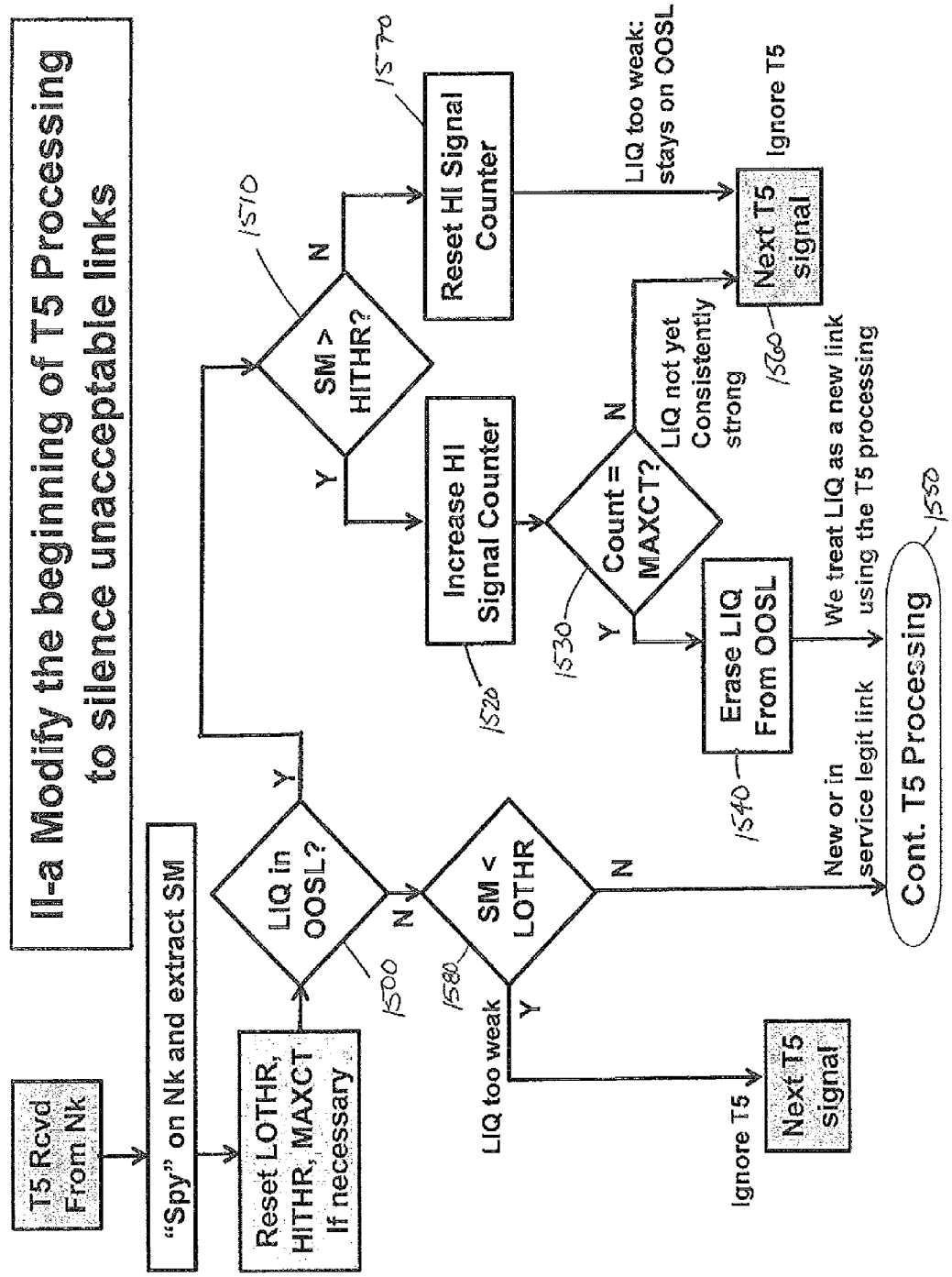
FIG. 23 is a flowchart of T5 signal processing to silence unacceptable links.

The unacceptable links management system may be configured to silence links that are determined to be unacceptable in the URT, DNT, and PT, conduct an audit for silenced links listed in the URT greater than a maximum time period, as shown in FIG. 20, conduct an audit for silenced links listed in the DNT greater than a maximum time period, as shown in FIG. 21, and conduct an audit for silenced links listed in the PT greater than a maximum time period, as shown in FIG. 22. A portion of the audits may occur in T5 signal processing in which each node periodically broadcasts its node ID and hop count to inform neighboring nodes of its presence. The unacceptable links management system may modify T5 signal processing to silence unacceptable links, as shown in FIG. 23, by determining whether a link in question is listed in an out of service list at 1500. If the link in question is listed in the out of service list, then determining whether a service metric of the link in question is greater than a high threshold for that service metric at 1510. If the link in question is greater than a high threshold for that service metric, increasing a high signal counter to determine signal quality at 1520. If the high signal counter is greater than a maximum count at 1530, then removing the link in question from the out of service list at 1540 and processing the link according to T5 processing in which the link periodically broadcasts its node ID and hop count to inform neighboring nodes of its presence at 1550. If the high signal counter is less than or equal to a maximum count at 1530, then the link in question is not consistently strong and the link in question remains listed in the out of service list at 1560. If the link in question is less than or equal to a high threshold for that service metric at 1510, resetting a high signal counter because the link in question remains too weak at 1570.

If the link in question is not listed in the out of service list at 1500, then determining whether the service metric is greater than a low threshold for the service metric at 1580. If the service metric of the link in question is less than the low threshold for the service metric, then a T5 signal for that link in question is ignored at 1590. If the service metric of the link in question is greater than the low threshold for the service metric, then a T5 signal for that link in question is processed at 1550.

The unacceptable links management system may be configured such that lower quality links are accepted by lowering the values corresponding to the thresholds for the maximum count for the high signal counter and for the high and low thresholds for the service metric. Lower quality links may be accepted if no other active links exist from node Ni, active links from node Ni are overloaded, and remote links between Ni and a base station are overloaded.

Figure 24:
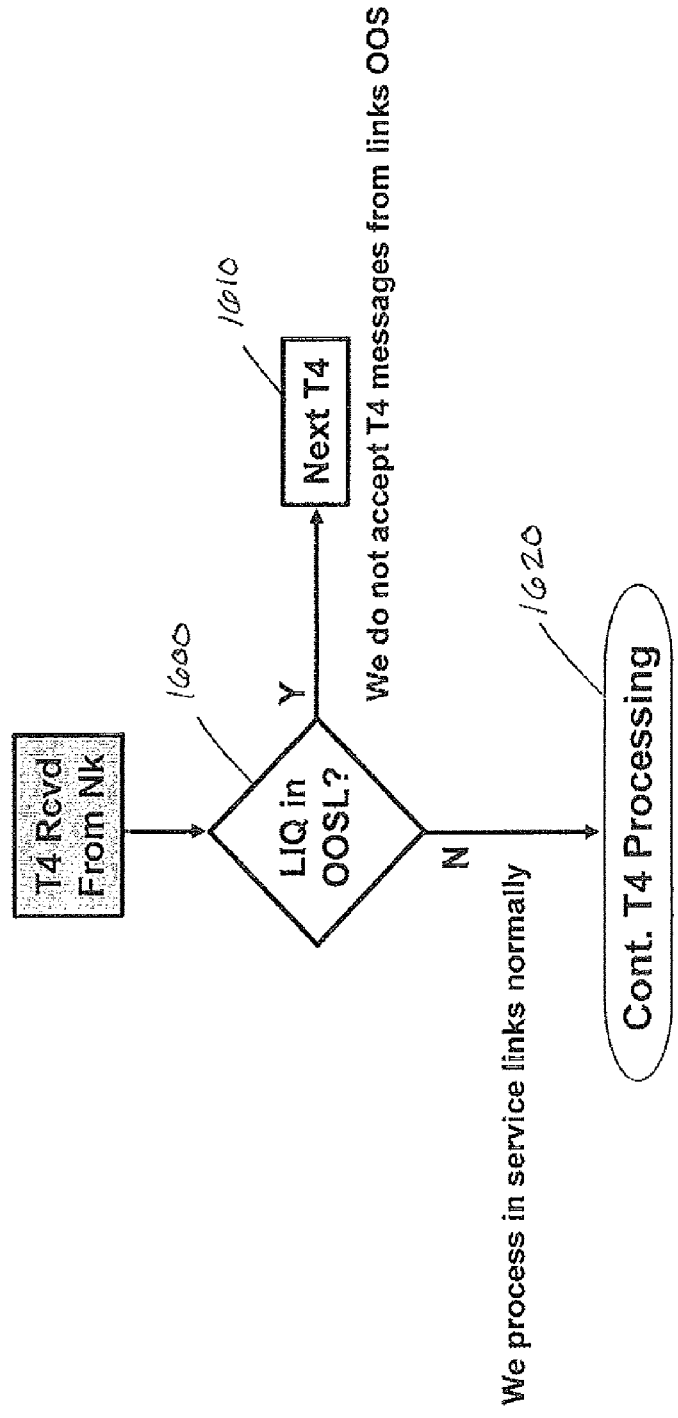
FIG. 24 is a flowchart of T4 signal processing to silence unacceptable links.

The unacceptable links management system, as shown in FIG. 24, may be configured such that a portion of the audits occur in T4 signal processing in which changes in downstream connectivity propagate to upstream nodes to update DRTs of those upstream nodes and as concerning a particular T4 signal, if the T4 signal is received from a link listed on an out of service list at 1600, then signal is canceled at 1610, otherwise the T4 signal is processed at 1620. The unacceptable links management system may be configured to silence links that are determined to be unacceptable in the URT, DNT, and PT by modifying T5 signal processing in which each node periodically broadcasts its node ID and hop count to inform neighboring nodes of its presence.

The unacceptable links management system may be configured to silence links that are determined to be unacceptable in the URT, DNT, and PT by modifying T4 signal processing in which changes in downstream connectivity propagate to upstream nodes to update DRTs of those upstream nodes. Modifications to nodes caused by the unacceptable links management system creates changes in at least one of the URT, PT, DRT and DNT.

An audit for silenced links may include a periodic audit for silenced links listed in the URTi for too long, such as greater than a maximum time period, as shown in FIG. 20. The audit may include determining whether Nk has been silent for a time period greater than a threshold time period at 1700. If yes, then taking Nk out of URTi and list Nk in the out of service list at 1710, but if no, returning to the beginning of the audit protocol at 1720. The audit may further include determining whether the URTi is empty at 1730. If yes, then, at 1740 recompute NTi, move PT into URTi, move DNTi into PT, recompute hop counts, and DNTi/DRT are empty, but if no, then return to beginning of audit protocol. The may further include determining whether URTi is empty at 1750. If yes, then set HCI of Ni to infinity and return to beginning of audit protocol at 1760. If no, then DCi equals a union of columns of DRTi+{Ni,0} at 1770 and the DCi is sent to upstream neighbors and to at least one peer at 1780. The audit may also be configured such that the DCi is sent to all peers at 1780. In such an embodiment, the internet-oriented mobile ad-hoc network may also include a loop prevention system to prevent infinite loops.

An audit for silenced links may include a periodic audit for silenced links listed in the DNTI too long, such as for greater than a maximum tune period, as shown in FIG. 21. The audit may include determining whether Nk has been silent for a time period greater than a threshold time period at 1800. If yes, then Nk is removed from DNTi, list Nk in the out of service list at 1810, update DRTi at 1820, DCi equals a union of columns of DRTi+{Ni,0} at 1830 and send DCi to upstream neighbors and to at least one peer at 1840, but if no, then return to beginning of audit protocol at 1850. The audit may also be configured such that the DCi is sent to all peers at 1850. In such an embodiment, the internet-oriented mobile ad-hoc network may also include a loop prevention system to prevent infinite loops.

An audit for silenced links may include a periodic audit for silenced links listed in the PTi too long, such as greater than a maximum time period, as shown in FIG. 22. The audit may include determining whether Nk has been silent for a time period greater than a threshold time period at 1900. If yes, then remove Nk from PTi, list Nk in the out of service list at 1910, DCi equals a union of columns of DRTi+{Ni,0} at 1920 and send DCi to upstream neighbors at 1930, but if no, then return to beginning of audit protocol at 1940.

Figure 25:
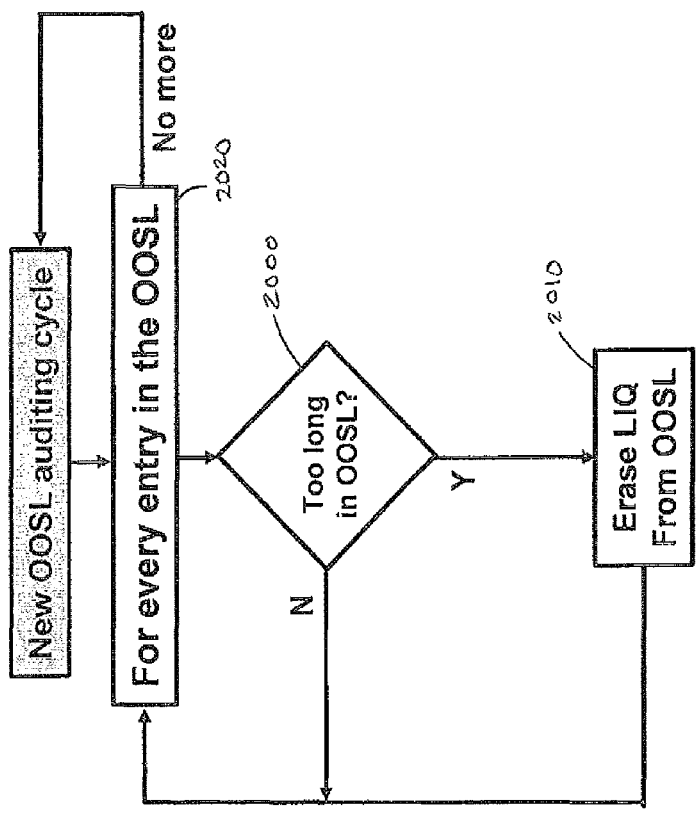
FIG. 25 is a flowchart of auditing for links listed for too long a period of time in an out of service list.

The unacceptable links management system, as shown in FIG. 25, may be configured such that the audit is capable of determining if links have been silenced longer than a threshold time period at 2000 and removing those links from an out of service list at 2010 is conducted on every entry in the out of service list at 2020.

Obviously, numerous other modifications and variations of the present invention are possible in light of the above teachings. It is therefore to be understood that within the scope of the appended claims, the invention may be practiced otherwise than as specifically described herein.

The invention claimed is:

1. An Internet-oriented mobile ad-hoc network, comprising:
   a plurality of nodes;
   wherein the nodes are communicatively accessible through any number of intermediate nodes, are capable of maintaining connectivity with each other when a gateway node is unavailable and are able to communicate upstream with any number of intermediate nodes;
   each of the nodes including transceivers, at least one node Ni further including an upstream routing table (URT), a peer table (PT), a downstream neighborhood table (DNT) and a downstream routing table (DRT), the at least one node being configured to use the associated tables to make routing decisions, and the at least one node configured to act as a relay for other nodes that cannot directly access a gateway node;
   wherein the at least one node Ni is configured to survive in an isolated condition;
   wherein the URT of the at least one node Ni is updated independently by the node Ni and lists each upstream neighboring node that is closer by one hop, to a particular gateway node than is the node Ni, together with the hop count from the upstream neighboring node to the particular gateway;
   wherein the PT of the node Ni is updated independently by the node Ni and lists each peer node, defined as a neighboring node that has equal distance, as measured by hop count, to a particular gateway node as the node Ni, together with an associated hop count to the particular gateway node;
   wherein the DNT of the node Ni is updated independently by the node Ni and lists each neighboring downstream node that is one hope count further away from a particular gateway node than the node Ni, together with the hop count of the downstream neighboring node to the particular gateway node;
   wherein the DRT of the node Ni is updated independently by the node Ni and lists each downstream node Nk, as defined by a node that can communicate with the node Ni and is further away from the node Ni, as measured by hop counts of the nodes Ni and Nk to a particular gateway node, together with the hop count of the downstream node Nk to the node Ni;
   wherein the at least one node Ni periodically broadcasts a trigger message that comprises a node identification and hop count corresponding to a particular node to inform neighboring nodes that the particular node is present;
   wherein the at least one node Ni independently and periodically receives and processes control signals from neighboring nodes; and
   wherein the at least one node Ni updates the tables within itself and the at least one node Ni communicates changes to neighboring nodes.

2. The network of claim 1, wherein the at least one node is selected from the group consisting of a wireless node, a fixed node, and both a wireless node and a fixed node.

3. The network of claim 2, wherein the at least one node is selected from the group consisting of a gateway node, a relay node, and both a gateway node and a relay node.

4. The network of claim 1, wherein the at least one node is configured to function as a gateway node in communication with the Internet and is configured to function as a wireless node.

5. The network of claim 1, wherein the at least one node functions as a relay for a remote gateway node and functions as a gateway node for other nodes.

6. The network of claim 1, wherein each node includes a peer downstream routing table (PDRT) of each peer node.

7. The network of claim 1, wherein the node includes a plurality of gateway nodes, for every gateway Gj, the wireless node Ni can communicate with, node Ni has a different set of tables, URTij, PTij, DNTij and DRTij;
   wherein the URTij of the node Ni with respect to the gateway Gj lists each upstream neighboring node that is closer by one hop to the gateway Gj than the node Ni, together with the hop count of the upstream node to the gateway Gj;
   the PTij of the node Ni with respect to the gateway Gj lists each peer node, as defined as a neighboring node that has equal distance, as measured by a hop count, to the gateway Gj as Ni, together with an associated hop count to the gateway Gj;
   the DNTij of the node Ni with respect to the gateway Gj lists each downstream neighboring node that is further away from the gateway Gj than Ni, together with the hop count of the downstream node to the gateway Gj; and
   the DRTij of the node Ni with respect to the gateway Gj lists each downstream node, as defined by a node that is reachable from Ni and is further away, as measured by a hop count, from the gateway Gj than Ni, together with the hop count of the downstream node to the gateway Gj;
   wherein the node Ni independently receives and processes control signals from neighboring nodes; and
   wherein the node Ni updates the tables within itself and each node communicates changes to neighboring nodes.

8. The network of claim 1, wherein the gateway node is connected to the Internet via a central node.

9. The network of claim 8, wherein the central node is connected to at least one other gateway node.

10. The network of claim 1, wherein each of the nodes is configured to act as a relay for other nodes that cannot directly access the gateway node.

11. The network of claim 1, wherein all of the nodes are mobile, wireless nodes.

12. The network of claim 1, wherein some of the nodes are mobile, wireless nodes and other nodes are fixed, wireless nodes.

13. The network of claim 1, wherein the DRTs are indexed by destination node.

14. The network of claim 1, wherein the DRTs are indexed by downstream neighbor.

15. The network of claim 1, wherein the DRTs are indexed by both destination node and downstream neighbor.

16. A method for Internet-oriented mobile ad-hoc network upon a failure, the Internet-oriented mobile ad-hoc network including a multiplicity of nodes, the method comprising the steps of:

receiving a packet by at least one node Ni;
 wherein the network includes a plurality of nodes;
 wherein the nodes are communicatively accessible through any number of intermediate nodes, are capable of maintaining connectivity with each other when a gateway node is unavailable and are able to communicate upstream with any number of intermediate nodes; and
 wherein at least one node Ni in the network includes an upstream routing table (URT), a peer table (PT), a downstream neighboring table (DNT) and a downstream routing table (DRT);
 wherein the URT is updated independently by the node Ni and lists each upstream neighboring node that is closer by one hop to a particular node than the node Ni, together with the hop count of the upstream node to the particular node;
 wherein the PT is updated independently by the node Ni and lists each peer node, as defined as a neighboring node that has equal distance, as measured by hop count, to a particular node as the node Ni, together with an associated hop count to the particular node;
 wherein the DNT is updated independently by the node Ni and lists each neighboring downstream node that is further away from a particular node than the node Ni, together with the hop count of the downstream node to the particular node; and
 wherein the DRT is updated independently by the node Ni and lists each downstream node, as defined by a node that is reachable from the node Ni and is further away, as measured by a hop count, from a particular node than the node Ni, together with the hop count of the downstream node;
receiving a trigger message by the receiving node Ni, wherein the trigger message is generated by a neighboring node; and
updating the tables of the receiving node Ni by the receiving node Ni and thus reorganizing the network.

17. The method of claim 16, wherein receiving a packet by node Ni, wherein the network includes a plurality of nodes comprises receiving the packet by node Ni, wherein the network includes a plurality of nodes, wherein the at least one node Ni is selected from the group consisting of a wireless node, a fixed node, and both a wireless node and a fixed node.

18. The method of claim 17, wherein receiving a packet by node Ni, wherein the network includes a plurality of nodes comprises receiving the packet by node Ni, wherein the network includes a plurality of nodes, wherein the at least one node Ni is selected from the group consisting of a gateway node, a relay node, an isolated node and both a gateway node and a relay node.

19. The method of claim 16, further comprising:

generating a trigger message D1 when the packet cannot be sent successfully from the node Ni to a downstream neighbor Nk in the DNT of the node Ni;
processing the generated trigger message D1 by removing the downstream neighbor Nk to which the packet could not be sent from the DNT of the node Ni;
updating the DRT of the node Ni;
computing a downstream cluster by calculating a union of columns of the DRT and adding the node Ni and its hop count 0; and
sending a trigger message T4 including the downstream cluster to upstream neighbors of the node Ni and to at least one peer.

20. The method of claim 19, wherein sending a trigger message T4 including the downstream cluster to upstream neighbors comprises sending a trigger message T4 including the downstream cluster to upstream neighbors of the node Ni and to all peers and further comprising a computation loop prevention system.

21. The method of claim 16, further comprising:

generating a trigger message D2 upon the occurrence of the event when the packet cannot be sent successfully from the node Ni to a destination node Nd in the DRT of node Ni;
processing the generated trigger message D2 by computing a downstream cluster, the computing comprising calculating a union of columns of the DRT and adding the node Ni and its hop count 0; and
sending a trigger message T4 including the downstream cluster to upstream neighbors and to at least one peer of the node Ni.

22. The method of claim 21, wherein sending a trigger message T4 including the downstream cluster to upstream neighbors comprises sending a trigger message T4 including the downstream cluster to upstream neighbors and to all peers of the node Ni and further comprising a computation loop prevention system.

23. The method of claim 16, further comprising:

generating a trigger message U1 when the packet cannot be sent successfully from the node Ni to an upstream neighbor Nk in the URT of the node Ni;
processing the generated trigger message U1 by removing the upstream neighbor Nk to which the packet could not be sent from the URT of the node Ni;
if the URT is not empty, ending the process; and
if the URT is empty:
 making the PT of node Ni the new URT of the receiving node Ni;
 making the DNT of node Ni the new PT of the receiving node Ni;
 emptying the DNT and DRT of node Ni;
 if the new URT of node Ni is empty, setting a hop count of node Ni to infinity and ending the process; and
 if the new URT of node Ni is not empty:
  computing a downstream cluster by calculating a union of columns of the DRT and adding node Ni and its hop count 0; and
  sending a trigger message T4 including the downstream cluster to upstream neighbors and to at least one peer of node Ni.

24. The method of claim 23, wherein sending a trigger message T4 including the downstream cluster to upstream neighbors comprises sending a trigger message T4 including the downstream cluster to upstream neighbors and to all peers of the node Ni and further comprising a computation loop prevention system.

25. The method of claim 16, further comprising:

in response to node Ni receiving the trigger message T4, modifying the trigger message T4 by increasing all hop counts of nodes in the trigger message T4 by one;

replacing the Nk column of the DRT of node Ni by the modified T4; and if the hop count of the node Ni is zero, ending the process; and if the hop count of the node Ni is not zero:
   computing a downstream cluster by calculating a union of columns of the DRT and adding node Ni and its hop count 0;
   if Nk is in PTi, then sending a trigger message T4 including the downstream cluster to upstream neighbors of node Ni in URTi; and
   if Nk is not in PTi, then sending a trigger message T4 including the downstream cluster to upstream neighbors of node Ni in URTi and PTi.

26. The method of claim 16, further comprising:
periodically broadcasting a trigger message T5 by each node, each trigger message T5 comprising a node ID and hop count corresponding to a particular node to inform neighboring nodes that the particular node is present;
generating a trigger message T5 upon predetermined changes;
receiving at receiving node Ni the trigger message T5 sent by a sending node Nk;
comparing the hop count of the receiving node Ni with the hop count of the sending node Nk;
if a difference between the hop count of the receiving node Ni and the hop count of the sending node Nk is greater than 2:
   removing Nk from the neighborhood of Ni if Nk is in the neighborhood;
   moving and adding all the nodes of the URT and PT of node Ni into the DNT of node Ni;
   moving Nk into the URT of Ni;
   resetting the hop count of Ni to the hop count of Nk augmented by 1; and
   sending to all the neighbors of Ni a trigger message T5 composed of Ni and its hop count;
if a difference between the hop count of the receiving node Ni and the hop count of the sending node Nk is equal to 2:
   removing Nk from the neighborhood of Ni if Nk is in the neighborhood;
   moving and adding all the nodes of the PT of node Ni into the DNT of node Ni, then moving all the nodes of the URT of Ni to the PT of Ni;
   moving Nk into the URT of Ni;
   resetting the hop count of Ni to the hop count of Nk augmented by 1; and
   sending to all the neighbors of Ni a trigger message T5 composed of Ni and its hop count;
if a difference between the hop count of the receiving node Ni and the hop count of the sending node Nk is equal to 1:
   if Nk is in the URT of Ni, ending the process; and
   if Nk is not in the URT of Ni:
     if Nk is in the neighborhood of Ni, removing Nk from the neighborhood of Ni;
     adding Nk to the URT of Ni;
     computing a trigger message T4 by performing a union of columns of the DRT of Ni and adding the node Ni with a hop count of zero; and
     sending the trigger message T4 to all the nodes in the URT of Ni if Nk was in the DNT of Ni, otherwise sending the trigger message T4 to Nk only;
if a difference between the hop count of the sending node Nk and the hop count of the receiving node Ni is greater than or equal to 1:
   if node Nk is in the DNT of node Ni, setting the hop count of node Nk to the hop count of Ni plus 1; and
   if node Nk is not in the DNT of node N:
     if Nk is in the Neighborhood of Ni, removing Nk from the neighborhood table of node Ni;
     entering Nk into the DNT of Ni
     setting the hop count of node Nk to the hop count of Ni plus 1;
     if the URT of node Ni is empty, then moving the nodes in PT of Ni into URT; and
     moving the nodes in DNT of Ni into PT;
     if the URT of node Ni is not empty:
       computing a trigger message T4 by performing the union of the columns of the DRT of Ni and adding node Ni with hop count zero; and
       sending the trigger message T4 to all the nodes in the URT and at least one peer of node Ni;
     setting the hop count of Ni to infinity if URT of Ni is empty;
sending a trigger message T5 (Ni and its hop count) to Nk;
if the hop count of the sending node Nk and the hop count of the receiving node Ni are equal:
if Nk is in the PT of Ni, ending the process; and
if Nk is not in the PT of Ni:
   if Nk is in the Neighborhood of Ni, removing Nk out of the neighborhood of Ni;
   entering node Nk into the PT of Ni:
   setting the hop count of Nk to the hop count of Ni;
   if the URT of node Ni is empty, then
     moving the nodes in PT of Ni into URT, and
     moving the nodes in DNT of node Ni into PT;
     if URT of node Ni is empty, setting the hop count of Ni to infinity; and
   if the URT of Ni is not empty, then:
     Computing a trigger message T4 by performing the unions of the columns of the DRT of Ni and adding Ni with hop count zero;
     Sending the trigger message T4 to all the nodes in the URT and at least one peer of Ni;
moving to process next signal.

27. The method of claim 26, wherein within determining if a difference between the hop count of the sending node Nk and the hop count of the receiving node Ni is greater than or equal to 1, wherein sending a trigger message T4 to all the nodes in the URT and at least one peer of Ni comprises sending a trigger message T4 to all the nodes in the URT and to all peers of Ni and further comprising a computation loop prevention system.

28. The method of claim 26, wherein within determining if the hop count of the sending node Nk and the hop count of the receiving node Ni are equal, wherein sending a trigger message T4 to all the nodes in the URT and at least one peer of Ni comprises sending a trigger message T4 to all the nodes in the URT and to all peers of Ni and further comprising a computation loop prevention system.

29. The method of claim 16, wherein receiving a packet by a receiving node Ni comprises receiving a packet by a node Ni that has multiple simultaneous associations with gateway nodes, thereby providing additional communication paths from every node Ni to gateway nodes, eliminating the need for active handover dialogue between node Ni and gateway nodes and preventing dropped communication lines.

30. The method of claim 29, wherein for each particular gateway node in the potential multiplicity of fixed gateways nodes, at every node Ni that can communicate with a fixed gateway node, the multiplicity of trigger messages generated with respect to any fixed gateway node Gj is processed independently of the multiplicity of trigger messages generated with respect to any other fixed gateway nodes Gk.

31. The method of claim 16, for comprising:
extracting from the packet a final destination address;
wherein if the final destination address is Ni, then halting further processing of the packet, and otherwise:
if the final destination address of the packet is not inside the Internet-oriented mobile ad-hoc network and Ni is a gateway node, then sending the packet to the final destination;
if the final destination address of the packet is not inside the Internet-oriented mobile ad-hoc network and Ni is not a gateway node, then sending the packet to a destination in a URTik of Ni towards gateway node Gk, and:
if there is a failure, then generate a trigger message U1k;
if the final destination address of the packet is inside the Internet-oriented mobile ad-hoc network and it is not in any DNTij or a DRTij of Ni, then:
if Ni is the gateway node, then halting further processing, and
if Ni is not the gateway node, sending the packet to a destination in a URTik of Ni towards gateway node Gk; and
if there is a failure, then generate a trigger message U1k;
if the final destination address of the packet is inside the Internet-oriented mobile ad-hoc network and the final destination address is in a DNTij or in a DRTij of node Ni, then sending the packet to that destination and
if there is a failure, then generating a trigger message D1j, if the destination is in DNTij, or a trigger message D2j, if the destination is in DRTij.

32. An Internet-oriented mobile ad-hoc network, comprising:
a plurality of nodes communicatively through any number of intermediate nodes are capable of maintaining connectivity with each other when a gateway node is unavailable and are able to communicate upstream with at least one gateway node through any number of intermediate nodes;
wherein each of the nodes including transceivers;
each of the nodes further including, for each of the at least one gateway node, an upstream routing table (URT), a peer table (PT), a downstream neighborhood table (DNT), a peer downstream routing table (PDRT) of at least one peer node and a downstream routing table (DRT), each of the nodes being configured to use the associated tables to make routing decisions, some of the nodes being configured to act as a relay for other nodes that cannot directly access the at least one gateway node;
wherein the URT of a node Ni is updated independently by the node Ni and lists each upstream neighboring node that is closer by one hop, to a particular gateway node than is the node Ni, together with the hop count from the upstream neighboring node to the particular gateway;
wherein the PT of the node Ni is updated independently by the node Ni and lists each peer node, defined as a neighboring node that has equal distance, as measured by hop count, to a particular gateway node as the node Ni, together with an associated hop count to the particular gateway;
wherein the DNT of the node Ni is updated independently by the wireless node Ni and lists each neighboring downstream node that is one hope count further away from a particular gateway node than the node Ni, together with the hop count of the downstream neighboring node to the particular gateway node;
wherein the DRT of the node Ni is updated independently by the wireless node Ni and lists each downstream node Nk, as defined by a node that can communicate with the node Ni and is further away from the node Ni, as measured by hop counts of the nodes Ni and Nk to a particular gateway node, together with the hop count of the downstream node Nk to the node Ni;
wherein each node periodically broadcasts a trigger message that comprises a node identification and hop count corresponding to a particular node to inform neighboring nodes that the particular node is present;
wherein each node independently and periodically receives and processes control signals from neighboring nodes;
wherein each node independently and periodically receives and processes control signals from the at least one peer node, including updated PDRT tables; and
wherein each node updates the tables within itself and each node communicates changes to neighboring nodes.

33. The Internet-oriented mobile ad-hoc network of claim 32, wherein the node includes a peer downstream routing table (PDRT) of for each peer node regardless of hop count and further comprising a computation loop prevention system.

34. An Internet-oriented mobile ad-hoc network, comprising:
a plurality of nodes communicatively accessible through any number of intermediate nodes, are capable of maintaining connectivity with each other when a gateway node is unavailable and are able to communicate upstream with at least one gateway node through any number of intermediate nodes, each of the nodes including transceivers, each of the nodes further including, for each of the at least one gateway node, an upstream routing table (URT), a peer table (PT), a downstream neighborhood table (DNT) and a downstream routing table (DRT), each of the nodes being configured to use the associated tables to make routing decisions, some of the nodes being nodes, some of the nodes being configured to act as a relay for other nodes that cannot directly access the at least one gateway node;
wherein the URT of a node Ni is updated independently by the node Ni and lists each upstream neighboring node that is closer by one hop, to a particular gateway node than is the node Ni, together with the hop count from the upstream neighboring node to the particular gateway;
wherein the PT of the node Ni is updated independently by the node Ni and lists each peer node, defined as a neighboring node that has equal distance, as measured by hop count, to a particular gateway node as the node Ni, together with an associated hop count to the particular gateway;
wherein the DNT of the node Ni is updated independently by the node Ni and lists each neighboring downstream node that is one hope count further away from a particular gateway node than the node Ni, together with the hop count of the downstream neighboring node to the particular gateway node;
wherein the DRT of the node Ni is updated independently by the node Ni and lists each downstream node Nk, as defined by a node that can communicate with the node Ni and is further away from the node Ni, as measured by hop counts of the nodes Ni and Nk to a particular gateway node, together with the hop count of the downstream node Nk to the node Ni;

wherein each node periodically broadcasts a trigger message that comprises a node identification and hop count corresponding to a particular node to inform neighboring nodes that the particular node is present;

wherein each node independently and periodically receives and processes control signals from neighboring nodes;

wherein each node updates the tables within itself and each node communicates changes to neighboring nodes; and an unacceptable links management system that is configured to silence links that are determined to be unacceptable; to return links to service that have been silenced if the links become acceptable or, if the links have been silenced longer than a threshold time period, the links are moved to an out of service list;

wherein the unacceptable links management system is configured to periodically audit the out of service list to identify links that have service metrics greater than a threshold and returning those links to service; and wherein the unacceptable links management system is configured to cancel links that remain below the threshold for more than a particular period of time.

35. The internet-oriented mobile ad-hoc network of claim 34, wherein the unacceptable links management system is configured to silence links that are determined to be unacceptable in the URT, DNT, and PT, conduct an audit for silenced links listed in the URT greater than a maximum time period, conduct an audit for silenced links listed in the DNT greater than a maximum time period, and conduct an audit for silenced links listed in the PT greater than a maximum time period.

36. The Internet-oriented mobile ad-hoc network of claim 34, wherein at least a portion of the audits occur in T5 signal processing in which each node periodically broadcasts its node ID and hop count to inform neighboring nodes of its presence.

37. The Internet-oriented mobile ad-hoc network of claim 36, wherein the unacceptable links management system modifies T5 signal processing to silence unacceptable links by determining whether a link in question is listed in an out of service list;

if the link in question is listed in the out of service list, then determining whether a service metric of the link in question is greater than a high threshold for that service metric;

if the link in question is greater than a high threshold for that service metric, increasing a high signal counter to determine signal quality;

if the high signal counter is greater than a maximum count, then removing the link in question from the out of service list and processing the link according to T5 processing in which the link periodically broadcasts its node ID and hop count to inform neighboring nodes of its presence;

if the high signal counter is less than or equal to a maximum count, then the link in question is not consistently strong and the link in question remains listed in the out of service list;

if the link in question is less than or equal to a high threshold for that service metric, resetting a high signal counter because the link in question remains too weak;

if the link in question is not listed in the out of service list, then determining whether the service metric is greater than a low threshold for the service metric;

if the service metric of the link in question is less than the low threshold for the service metric, then a T5 signal for that link in question is ignored;

if the service metric of the link in question is greater than the low threshold for the service metric, then a T5 signal for that link in question is processed.

38. The Internet-oriented mobile ad-hoc network of claim 37, wherein lower quality links are accepted by lowering the values corresponding to the thresholds for the maximum count for the high signal counter and for the high and low thresholds for the service metric.

39. The Internet-oriented mobile ad-hoc network of claim 38, wherein lower quality links are accepted if no other active links exist from node Ni, active links from node Ni are overloaded, and remote links between Ni and a base station are overloaded.

40. The Internet-oriented mobile ad-hoc network of claim 34, wherein at least a portion of the audits occur in T4 signal processing in which changes in downstream connectivity propagate to upstream nodes to update DRTs of those upstream nodes and as concerning a particular T4 signal, if the T4 signal is received from a link listed on an out of service list, then signal is canceled, otherwise the T4 signal is processed.

41. The Internet-oriented mobile ad-hoc network of claim 34, wherein the unacceptable links management system that is configured to silence links that are determined to be unacceptable in the URT, DNT, and PT by modifying T5 signal processing in which each node periodically broadcasts its node ID and hop count to inform neighboring nodes of its presence.

42. The Internet-oriented mobile ad-hoc network of claim 34, wherein the unacceptable links management system that is configured to silence links that are determined to be unacceptable in the URT, DNT, and PT by modifying T4 signal processing in which changes in downstream connectivity propagate to upstream nodes to update DRTs of those upstream nodes.

43. The Internet-oriented mobile ad-hoc network of claim 34, wherein modifications to nodes caused by the unacceptable links management system creates changes in at least one of the URT, PT, DRT and DNT.

44. The Internet-oriented mobile ad-hoc network of claim 34, wherein the audit for silenced links comprises a periodic audit for silenced links listed in the URTi greater than a maximum time period comprising:

determining whether Nk has been silent for a time period greater than a threshold time period;

if yes, then remove Nk from URTi and list Nk in the out of service list;

determining whether the URTi is empty;

if yes, then, recompute NTi, move PT into URTi, move DNTi into PT, recompute hop counts, and DNTi/DRT are empty;

determining whether URTi is empty;

if yes, then set HCl of Ni to infinity and return to beginning of audit protocol;

if no, then DCi equals a union of columns of DRTi+{Ni,0} and send the DCi to upstream neighbors and to at least one peer;

if no, then return to beginning of audit protocol;

if no, then return to beginning of audit protocol.

45. The Internet-oriented mobile ad-hoc network of claim 44, wherein DCi is sent to all peers and further comprising a computation loop prevention system.

46. The Internet-oriented mobile ad-hoc network of claim 34, wherein the audit for silenced links comprises a periodic audit for silenced links listed in the DNTi greater than a maximum time period comprising:

determining whether Nk has been silent for a time period greater than a threshold time period;
    if yes, then remove Nk from DNTi, list Nk in the out of service list, update DRTi, DCi equals a union of columns of DRTi+{Ni,0} and send DCi to upstream neighbors and to at least one peer;
    if no, then return to beginning of audit protocol.

47. The Internet-oriented mobile ad-hoc network of claim 46, wherein DCi is sent to all peers and further comprising a computation loop prevention system.

48. The Internet-oriented mobile ad-hoc network of claim 34, wherein the audit for silenced links comprises a periodic audit for silenced links listed in the PTi greater than a maximum time period comprising:

determining whether Nk has been silent for a time period greater than a threshold time period;
    if yes, then remove Nk from PTi, list Nk in the out of service list, DCi equals a union of columns of DRTi+{Ni,0} and send DCi to upstream neighbors;
    if no, then return to beginning of audit protocol.

49. The Internet-oriented mobile ad-hoc network of claim 34, wherein the audit to determine if the links have been silenced longer than a threshold time period, the links are moved to an out of service list comprises auditing every entry in the out of service list.

50. A communication device configured for use in an Internet-oriented mobile ad-hoc network, comprising:

a node Ni configured to survive in an isolated condition; and
    wherein the node Ni is configured to be communicatively accessible through any number of intermediate nodes, to maintain connectivity with other nodes when a gateway node is unavailable and to communicate with the other nodes, wherein the node includes a transceiver, an upstream routing table (URT), a peer table (PT), a downstream neighborhood table (DNT) and a downstream routing table (DRT),
    wherein the node Ni periodically broadcasts a trigger message that comprises a node identification and hop count equivalent to infinity to inform neighboring nodes that the particular node is present;
    wherein the node Ni independently and periodically receives and processes control signals from neighboring nodes; and
    wherein the node Ni updates the tables within itself and the node Ni communicates changes to neighboring nodes.

* * * * *